(12) United States Patent
Lee et al.

(10) Patent No.: US 10,551,538 B2
(45) Date of Patent: Feb. 4, 2020

(54) FLEXIBLE DISPLAY DEVICE

(71) Applicant: SAMSUNG DISPLAY CO., LTD., Yongin-si, Gyeonggi-Do (KR)

(72) Inventors: Heeyoung Lee, Suwon-si (KR); Eunmi Seo, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 152 days.

(21) Appl. No.: 15/795,923

(22) Filed: Oct. 27, 2017

(65) Prior Publication Data

US 2018/0149786 A1 May 31, 2018

(30) Foreign Application Priority Data

Nov. 28, 2016 (KR) .......................... 10-2016-0159645

(51) Int. Cl.
*G02B 5/30* (2006.01)

(52) U.S. Cl.
CPC ................... *G02B 5/3016* (2013.01)

(58) Field of Classification Search
CPC .......... G02B 1/08; G02B 1/14; G02B 5/3016; G02F 1/133305
USPC ....................................................... 349/194
See application file for complete search history.

(56) References Cited

U.S. PATENT DOCUMENTS

| 9,423,915 B2 | 8/2016 | Kang et al. |
| 9,588,271 B2 | 3/2017 | Yamada et al. |
| 2018/0059300 A1* | 3/2018 | Kim .......................... G02B 1/14 |
| 2018/0095211 A1 | 4/2018 | Lee et al. |
| 2018/0149785 A1 | 5/2018 | Lee et al. |

FOREIGN PATENT DOCUMENTS

| KR | 1020150012389 | 2/2015 |
| KR | 1020160036466 | 4/2016 |
| KR | 1020160055431 | 5/2016 |
| KR | 101631399 | 6/2016 |
| KR | 1020170106599 | 9/2017 |
| KR | 1020170113762 | 10/2017 |
| KR | 10-2018-0036864 | 4/2018 |
| KR | 10-2018-0061484 | 6/2018 |

* cited by examiner

*Primary Examiner* — Nathanael R Briggs
*Assistant Examiner* — William D Peterson
(74) *Attorney, Agent, or Firm* — F. Chau & Associates, LLC

(57) ABSTRACT

A flexible display device includes a display module including a bending area that is bendable along a reference axis, and a polarization member disposed on the display module. The polarization member includes a λ/4 phase retardation layer disposed on the display module and including a nematic liquid crystal coating layer. The polarization member further includes a first adhesion member disposed on the λ/4 phase retardation layer, a λ/2 phase retardation layer disposed on the first adhesion member and including a discotic liquid crystal coating layer, a second adhesion member disposed on the λ/2 phase retardation layer, and a line polarizer disposed on the second adhesion member and including an absorption axis, wherein an angle between the reference axis and the absorption axis is about 15 degrees to about 75 degrees.

23 Claims, 14 Drawing Sheets

FLEXIBLE DISPLAY DEVICE

CROSS-REFERENCE TO RELATED APPLICATION

This U.S. non-provisional patent application claims priority under 35 U.S.C. § 119 to Korean Patent Application No. 10-2016-0159645 filed on Nov. 28, 2016, the disclosure of which is incorporated by reference herein in its entirety.

TECHNICAL FIELD

The present inventive concept herein relates to a flexible display device, and more particularly, to a flexible display device including a polarization member.

DISCUSSION OF THE RELATED ART

Various display devices used in multimedia devices such as televisions, mobile phones, table computers, navigation devices, and game consoles are currently under development. Particularly, flexible display devices that may be bent or folded are being developed.

When the flexible display devices are bent or folded, stress may be applied to various components of the display device, and accordingly, display quality may deteriorate.

SUMMARY

According to an exemplary embodiment of the present inventive concept, a flexible display device includes a display module including a bending area that is bendable along a reference axis, and a polarization member disposed on the display module. The polarization member includes a $\lambda/4$ phase retardation layer disposed on the display module and including a nematic liquid crystal coating layer. The polarization member further includes a first adhesion member disposed on the $\lambda/4$ phase retardation layer, a $\lambda/2$ phase retardation layer disposed on the first adhesion member and including a discotic liquid crystal coating layer, a second adhesion member disposed on the $\lambda/2$ phase retardation layer, and a line polarizer disposed on the second adhesion member and including an absorption axis, wherein an angle between the reference axis and the absorption axis is about 15 degrees to about 75 degrees.

In an exemplary embodiment of the present inventive concept, the $\lambda/4$ phase retardation layer includes a first optical axis, and the $\lambda/2$ phase retardation layer includes a second optical axis. An angle between the second optical axis and the absorption axis is about 2 degrees to about 28 degrees, and an angle between the first optical axis and the second optical axis is about 30 degrees to about 90 degrees.

In an exemplary embodiment of the present inventive concept, the $\lambda/4$ phase retardation layer includes a first optical axis, the $\lambda/2$ phase retardation layer includes a second optical axis, and the line polarizer includes a transmission axis having an angle of about 90 degrees with respect to the absorption axis. An angle between the second optical axis and the transmission axis is about 2 degrees to about 28 degrees, and an angle between the first optical axis and the second optical axis is about 30 degrees to about 90 degrees.

In an exemplary embodiment of the present inventive concept, one of a phase retardation value of the $\lambda/4$ phase retardation layer in a thickness direction of the $\lambda/4$ phase retardation layer and a phase retardation value of the $\lambda/2$ phase retardation layer in a thickness direction of the $\lambda/2$ phase retardation layer has a positive value, and the other one has a negative value.

In an exemplary embodiment of the present inventive concept, the first adhesion member includes an adhesive layer having a glass transition temperature of about 40° C. to about 150° C.

In an exemplary embodiment of the present inventive concept, the first adhesion member has a thickness of about 0.1 micrometers to about 5 micrometers.

In an exemplary embodiment of the present inventive concept, the first adhesion member includes an ultraviolet curable adhesive.

In an exemplary embodiment of the present inventive concept, the $\lambda/4$ phase retardation layer has a thickness of about 0.5 micrometers to about 5 micrometers.

In an exemplary embodiment of the present inventive concept, the second adhesion member includes an adhesive layer having a glass transition temperature of about −35° C. to about 0° C. or an adhesive layer having a glass transition temperature of about 40° C. to about 150° C.

In an exemplary embodiment of the present inventive concept, the display module has a display surface on which an image is displayed. The display surface is flat in a first operation mode, the display surface is bent such that two sides of the display surface faces each other in a second operation mode, and the display surface is bent such that the display surface is exposed to the outside in a third operation mode.

In an exemplary embodiment of the present inventive concept, the display module further including a flat non-bending area, and the bending area extends from at least one side of the flat non-bending area and has a bent shape.

In an exemplary embodiment of the present inventive concept, the flexible display further including a protection layer disposed under the display module.

In an exemplary embodiment of the present inventive concept, the protection layer includes an invar.

In an exemplary embodiment of the present inventive concept, the protection layer includes a plastic film.

In an exemplary embodiment of the present inventive concept, the display module further includes a non-bending area that extends from the bending area and is not bent, and the protection layer overlaps the non-bending area.

In an exemplary embodiment of the present inventive concept, the display module further includes a pad area. A driving chip is disposed on the pad area, and the protection layer partially overlaps the pad area.

In an exemplary embodiment of the present inventive concept, the display module includes a display area and a non-display area. The display area displays an image, and the non-display area does not display the image, and the protection layer overlaps the display area and the non-display area.

In an exemplary embodiment of the present inventive concept, the display module includes a display area and a non-display area. The display area displays an image, and the non-display area does not display the image, and the polarization member overlaps at least one of the display area and the non-display area.

In an exemplary embodiment of the present inventive concept, the display module further includes a display panel configured to display an image, and a touch sensing unit disposed on the display panel.

In an exemplary embodiment of the present inventive concept, the flexible display device further includes a touch sensing unit disposed on the polarization member.

According to an exemplary embodiment of the present inventive concept, a flexible display device including a flexible display module, and a polarization member disposed on the flexible display module. The polarization member includes a λ/4 phase retardation layer disposed on the flexible display module and includes a nematic liquid crystal coating layer having a positive phase retardation value in a thickness direction of the λ/4 phase retardation layer, a first adhesion member disposed on the λ/4 phase retardation layer and including an adhesive layer having a glass transition temperature of about 40° C. to about 150° C., a λ/2 phase retardation layer disposed on the first adhesion member and including a discotic liquid crystal coating layer having a negative phase retardation value in a thickness direction of the λ/2 phase retardation layer, a second adhesion member disposed on the λ/2 phase retardation layer, and a line polarizer disposed on the second adhesion member.

In an exemplary embodiment of the present inventive concept, the flexible display module includes a bending area that is bendable along a reference axis, the line polarizer includes an absorption axis and a transmission axis. An angle between the reference axis and the absorption axis is about 15 degrees to about 75 degrees, and an angle between the absorption axis and the transmission axis is about 90 degrees. The λ/4 phase retardation layer includes a first optical axis, and the λ/2 phase retardation layer includes a second optical axis, and an angle between the second optical axis and the transmission axis or between the second optical axis and the absorption axis is about 2 degrees to about 28 degrees, and an angle between the first optical axis and the second optical axis is about 30 degrees to about 90 degrees.

According to an exemplary embodiment of the present inventive concept, a flexible display device including a flexible display module including a display area and a non-display area, and a polarization member disposed on the flexible display module, and overlapping the display area and not overlapping the non-display area. The polarization member includes a λ/4 phase retardation layer disposed on the flexible display module and including a nematic liquid crystal coating layer, a first adhesion member disposed on the λ/4 phase retardation layer, a λ/2 phase retardation layer disposed on the first adhesion member and including a discotic liquid crystal coating layer. A phase retardation value of the λ/4 phase retardation layer has a polarity different from that of a phase retardation value of the λ/2 phase retardation layer. The polarization member includes a second adhesion member disposed on the λ/2 phase retardation layer, and a line polarizer disposed on the second adhesion member.

In an exemplary embodiment of the present inventive concept, polarization member further includes an optical compensation layer disposed on the λ/4 phase retardation layer.

In an exemplary embodiment of the present inventive concept, the flexible display module is bendable along a reference axis, and the line polarizer includes an absorption axis. An angle between the reference axis and the absorption axis, and the acute angle is about 45 degrees.

BRIEF DESCRIPTION OF THE DRAWINGS

The above and other features of the present inventive concept will become more apparent by describing in detail exemplary embodiments thereof, with reference to the accompanying drawings, in which.

DETAILED DESCRIPTION OF THE EMBODIMENTS

Figure 1A:
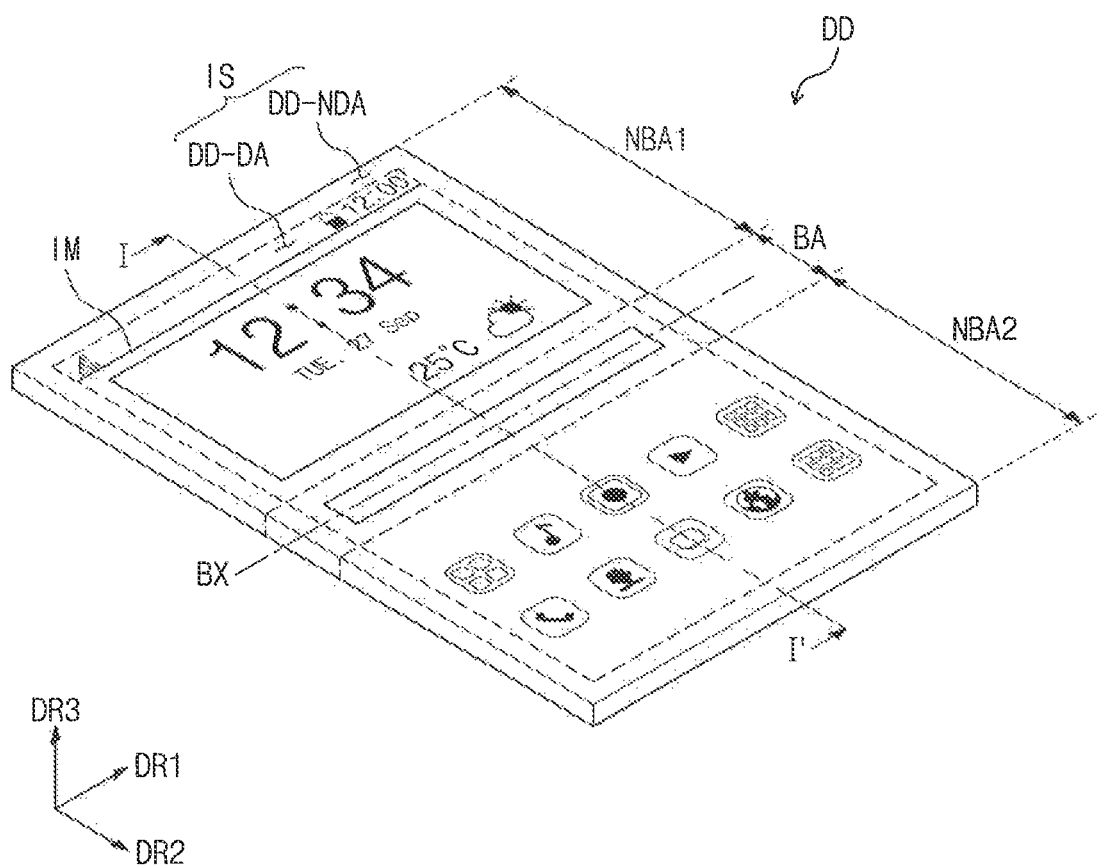
FIG. 1A is a perspective view illustrating a first operation mode of a display device according to an exemplary embodiment of the present inventive concept.

Exemplary embodiments of the present inventive concept will be described more fully hereinafter with reference to the accompanying drawings. It is to be understood that the present inventive concept may, however, be embodied in different forms and thus should not be construed as being limited to the exemplary embodiments set forth herein.

In the drawings, like reference numerals may refer to like elements. Also, in the figures, thickness, ratios, and dimensions of components and/or elements may be exaggerated for clarity.

Figure 1B:
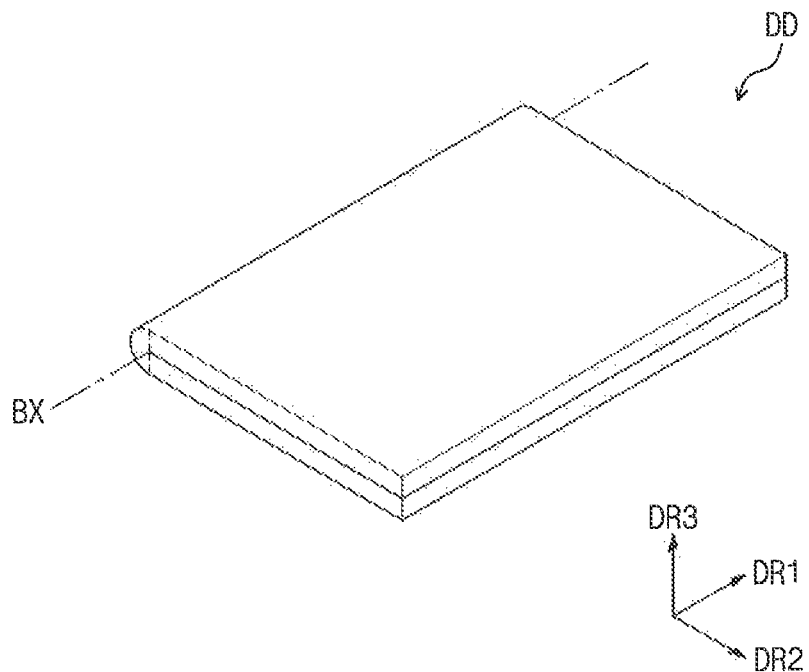
FIG. 1B is a perspective view illustrating a second operation mode of the display device according to an exemplary embodiment of the present inventive concept.
Figure 1C:
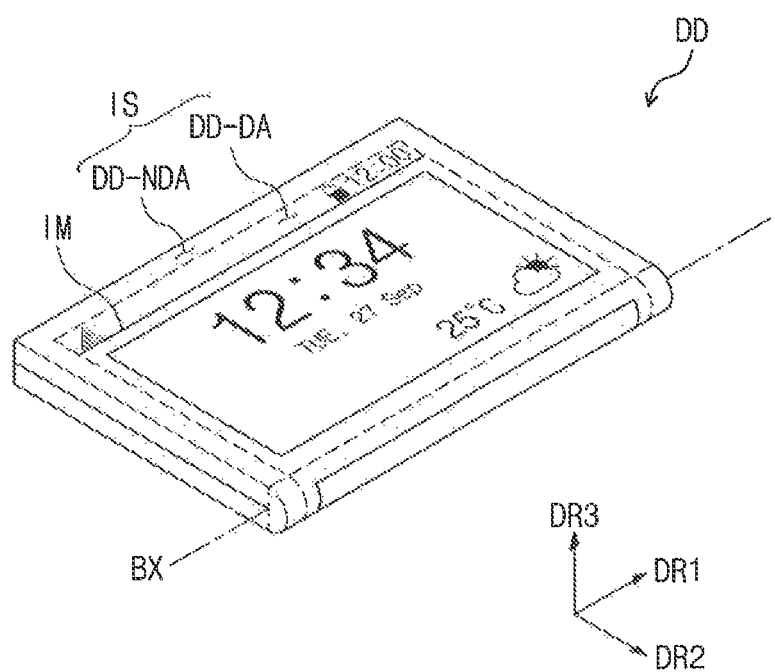
FIG. 1C is a perspective view illustrating a third operation mode of the display device according to an exemplary embodiment of the present inventive concept.

FIG. 1A is a perspective view illustrating a first operation mode of a display device DD according to an exemplary embodiment of the present inventive concept. FIG. 1B is a perspective view illustrating a second operation mode of a display device DD according to an exemplary embodiment of the present inventive concept. FIG. 1C is a perspective view illustrating a third operation mode of a display device DD according to an exemplary embodiment of the present inventive concept.

As illustrated in FIG. 1A, in a first operation mode, a display surface IS that displays an image IM is a surface that extends in a first direction DR1 and a second direction DR2. The first direction DR1 crosses the second direction DR2. In other words, the display surface IS may be flat. A third direction DR3 indicates a substantially perpendicular direction of the display surface IS, e.g., a thickness direction of the display device DD. A front surface (or, e.g., an upper surface) and a rear surface (or, e.g., lower surface) of the display device DD are layered with respect to the third direction DR3. Hereinafter, the first, second and third directions may be directions indicated by the first, second and third directions DR1, DR2, and DR3 and designated by the same reference numerals, respectively. In addition, the display surface IS may be included in a display module, which will be discussed later in more detail.

FIGS. 1A to 1C illustrate a display device DD that is flexible and foldable. In addition, the display device DD may be rollable or bendable, but the present inventive concept is not limited thereto. The display device DD according to an exemplary embodiment of the present inventive concept may be used for large-sized electronic devices, such as televisions and monitors, and small and middle-sized electronic devices, such as mobile phones, tablet personal computers (PCs), navigation devices for vehicles, game consoles, wearable devices, and smart watches.

As illustrated in FIG. 1A, the display surface IS of the display device DD may include a plurality of areas. The display device DD includes a display area DD-DA on which an image IM is displayed and a non-display area DD-NDA that is adjacent to the display area DD-DA. The non-display area DD-NDA may be an area on which an image is not displayed. FIG. 1A illustrates icons and a clock window of an application as an example of the image IM.

For example, the display area DD-DA may have a rectangular shape. The non-display area DD-NDA may surround the display area DD-DA. However, the present inventive concept is not limited thereto. For example, the non-display area DD-NDA may only partially surround the display area DD-DA.

As illustrated in FIGS. 1A to 1C, the display device DD may include a plurality of areas corresponding to functions of the display device DD. The display device DD may include a bending area BA that is bent along a reference axis BX (e.g., a bending axis) extending in the first direction DR1, a first non-bending area NBA1 that is not bent, and a second non-bending area NBA2 that is not bent. For example, the bending area BA may be positioned in a central portion of the display device DD, but the present inventive concept is not limited thereto.

As illustrated in FIG. 1B, in the second operation mode, the display device DD may be bent inward such that the display surface IS of the first non-bending area NBA1 and the display surface IS of the second non-bending area NBA2 face each other. As illustrated in FIG. 1C, in the third operation mode, the display device DD may be bent outward such that the display surface IS is exposed to the outside. In other words, the display surface IS of the first non-bending area NBA1 and the display surface IS of the second non-bending area NBA2 may face away from each other.

In an exemplary embodiment of the present inventive concept, the display device DD may be switched from the first operation mode to the second operation mode and from the second operation mode to the first operation mode. In other words, the display device DD may be only bent inward. In an exemplary embodiment of the present inventive concept, the display device DD may be switched from the first operation mode to the third operation mode and from the third operation mode to the first operation mode. In other words, the display device DD may be only bent outward. In an exemplary embodiment of the present inventive concept, the display device DD may be switched into the first, second, and third operation modes, e.g., bent inward and outward.

Although only one bending area BA is illustrated in FIGS. 1A to 1C, the present inventive concept is not limited thereto. For example, in an exemplary embodiment of the present inventive concept, the display device DD may include a plurality of bending areas BA.

In an exemplary embodiment of the present inventive concept, the display device DD may include a bending area BA having a shape that corresponds to how the user manipulates the display device DD (e.g., how the user bends or folds the display device DD). For example, unlike FIGS. 1B and 1C, the bending areas BA may be positioned closer to one side of the display device DD than another side of the display device DD, and not in a central portion of the display device DD. A surface area of the bending area BA might not be a fixed size, but may correspond to a curvature radius of the bending area when bent.

Figure 2:
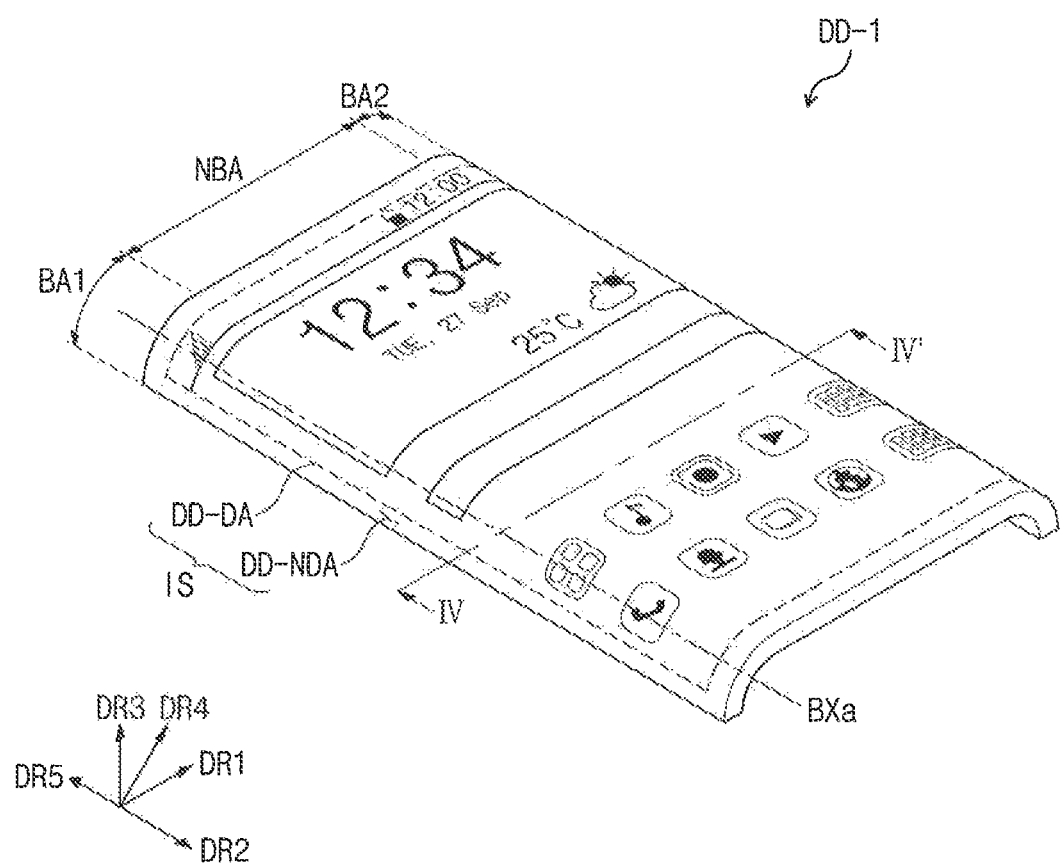
FIG. 2 is a perspective view of a display device according to an exemplary embodiment of the present inventive concept.

FIG. 2 is a perspective view of a display device DD-1 according to an exemplary embodiment of the present inventive concept.

Referring to FIG. 2, the display device DD-1 includes a non-bending area NBA (or, e.g., a planar area) corresponding to a front surface of the display area DD-DA, on which an image is displayed, and first and second bending areas BA1 and BA2 (or, e.g., first and second side areas) corresponding to side surfaces of the display area DD-DA, on which an image IM is displayed. In the current embodiment, the terms "non-bending area NBA" and "first and second bending areas BA1 and BA2" may form the display device DD-1 having a plurality of areas that are divided according to their shapes.

The first bending area BA1 displays an image in a fifth direction DR5, which is an opposite direction of the second direction DR2. The second bending area BA2 displays an image in the fifth direction DR5.

In addition, although the display device DD-1 includes a first bending area BA1 and a second bending area BA2 that are each bent from a side of the non-bending area NBA in FIG. 2, present inventive concept is not limited thereto. For example, the display device DD-1 may include only a bending area that is bent from one side of the non-bending area NBA or may include bending areas that are bent from at least three sides of the non-bending area NBA.

Figure 3A:
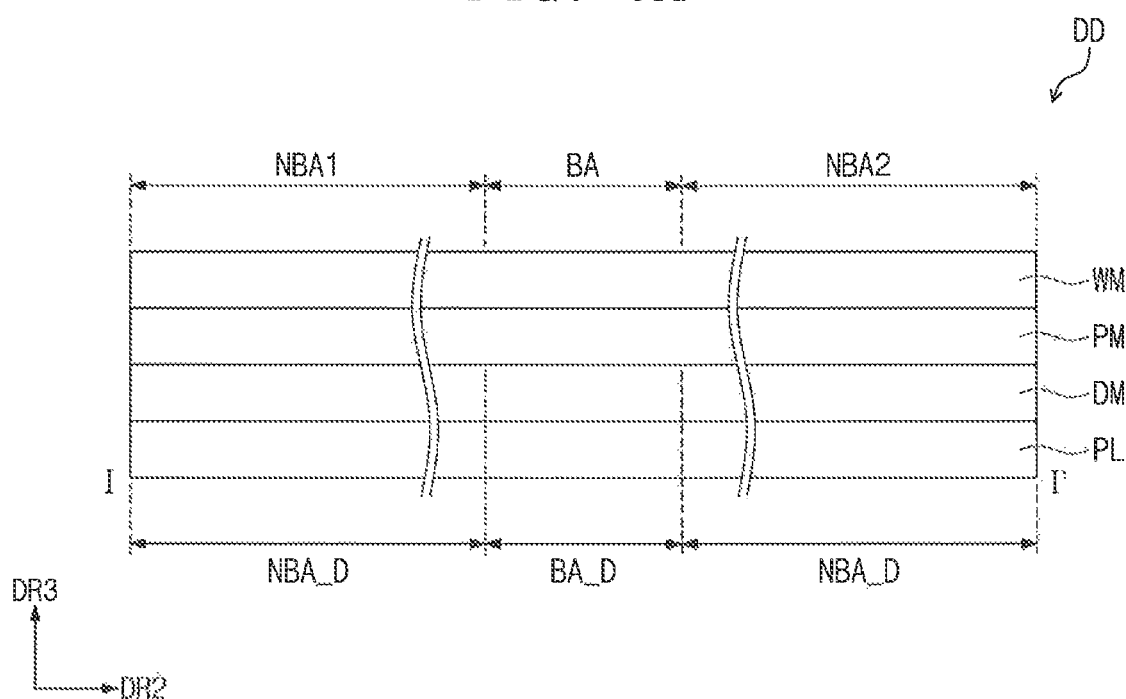
FIG. 3A is a cross-sectional view of a display device taken along line I-I' of FIG. 1A according to an exemplary embodiment of the present inventive concept.

FIG. 3A is a cross-sectional view of the display device DD taken along line I-I' of FIG. 1A according to an exemplary embodiment of the present inventive concept.

Referring to FIG. 3A, the display device DD may include a window WM, a polarization member PM, a display module DM (e.g., a flexible display module), and a protection layer PL. The polarization member PM may be disposed above the display module DM. The window WM may be disposed above the polarization member PM. The protection layer PL may be disposed under the display module DM.

The window WM and the polarization member PM, and the polarization member PM and the display module DM may be coupled to each other by an organic adhesive layer such as an optically clear adhesive film (OCA), an optically clear resin (OCR), or a pressure sensitive adhesive film (PSA). The organic adhesive layer may include an adhesion material such as a polyurethane-based material, a polyacrylic-based material, a polyester-based material, a polyepoxy-based material, and a polyvinyl acetate-based material.

The window WM may protect the display module DM against an external impact and may provide an input surface to a user (e.g., a touch input surface). The window WM may include a glass substrate or a plastic film. The window WM may include a material or various materials with a transparent property. The window WM may have a single layer structure or a multilayered structure. The multilayered structure may be formed through a continuous process or an adhesion process using an adhesive layer. In addition, the window WM may further include a bezel pattern.

The polarization member PM may reduce reflectance of external light. The polarization member PM may include a line polarizer and optical members such as a phase retardation layer and an optical compensation layer. In an exemplary embodiment of the present inventive concept, the polarization member PM may be disposed on a top surface of the display module DM to reduce the reflectance of the external light provided from the outside of the display device DD. The polarization member PM will be described later.

The display module DM may display an image. The display module DM may include a bending area BA-D and a non-bending area NBA-D. The bending area BA-D of the display module DM may correspond to the bending area BA of the display device DD, and the non-bending area NBA-D of the display module DM may correspond to the first and second bending areas NBA1 and NBA2 of the display device DD.

The protection layer PL may be disposed below the display module DM. The protection layer PL may protect the display module DM. For example, the protection layer PL may prevent external moisture or impurities from permeating into the display module DM and may absorb an external impact.

The protection layer PL may include a plastic film as a base substrate. The protection layer PL may include a plastic film including one of polyethersulphone (PES), polyacrylate (PAR), polyetherimide (PEI), polyethyelenennaphthalate (PEN), polyethyelenerepthalate(PET), polyphenylene sulfide (PPS), polyallylate, polyimide (PI), polycarbonate (PC), poly(arylene ethersulfone), and a combination thereof.

The protection layer PL may include a metal material. In this case, the protection layer PL may include a material having a high modulus of elasticity value. The modulus of elasticity of the protection layer PL may be in gigapaseals (GPa). In this case, when the display device DD is bent, an occurrence of buckling between the components disposed under the display module DM may be reduced, and thus, the interlayer delamination due to buckling may be reduced. The metal included in the protection layer PL may have a high modulus of elasticity value. For example, the protection layer PL may include invar. However, the present inventive concept is not limited thereto. For example, the protection layer PL may have a thickness between about 50 micrometers and about 100 micrometers. For example, when the display device DD is bent inward as illustrated in FIG. 1B, the protection layer PL may include a metal material. When the protection layer PL includes the metal material, the display device DD may further include a cushion layer disposed under the protection layer PL.

The protection layer PL may include an organic/inorganic composite material. The protection layer PL may include a porous organic layer and an inorganic material that is filled into the pores of the organic layer. The protection layer PL may further include a functional layer disposed on a plastic film. The functional layer may include a resin layer. The functional layer may be formed in a coating manner, in an exemplary embodiment of the present inventive concept, the protection layer PL may be omitted.

Figure 3B:
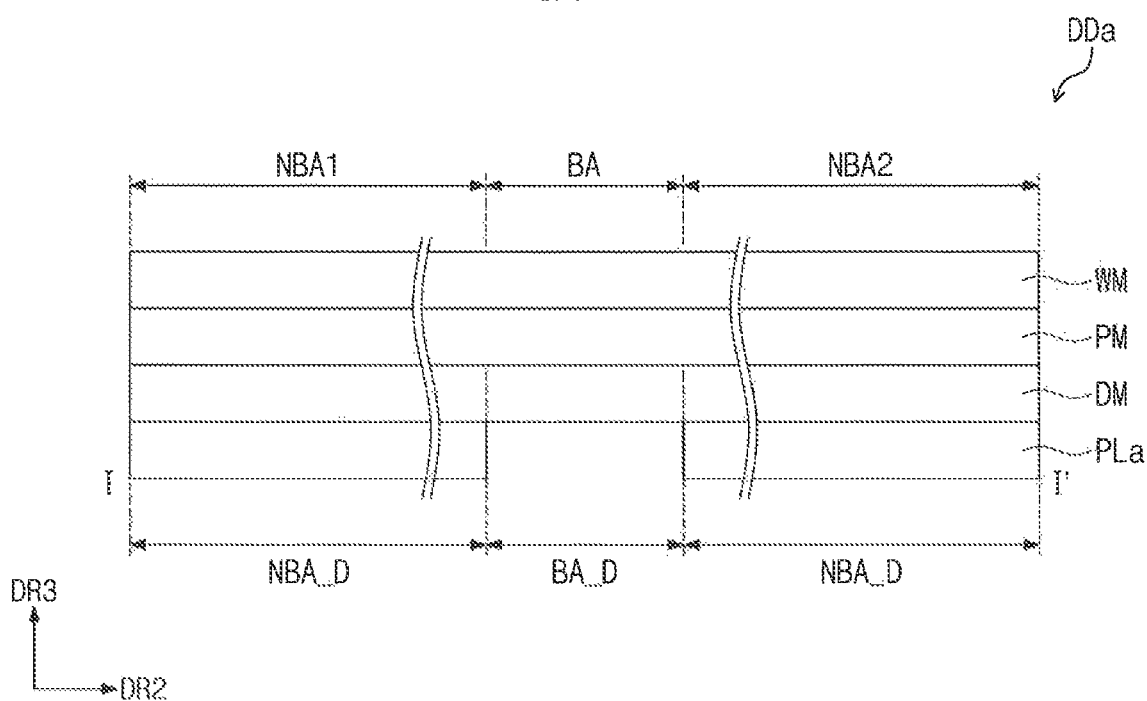
FIG. 3B is a schematic cross-sectional view of a display device taken along line I-I' of FIG. 1A according to an exemplary embodiment of the present inventive concept.

FIG. 3B is a cross-sectional view of a display device DDa, which is taken along line I-I' of FIG. 1A according to an exemplary embodiment of the present inventive concept. In description of FIG. 3B, the same reference numeral may be given to components and/or elements that are the same as those of FIG. 3A, and with regard to the components and/or elements that are the same as those in FIG. 3A, their detailed descriptions may be omitted.

Referring to FIG. 3B, a protection layer PLa might not overlap the bending area BA. In other words, the protection layer PLa may overlap only the first and second non-bending areas NBA1 and NBA2. The bending area BA of the display device DDa may have a thickness that is less than that of each of the first and second non-bending areas NBA1 and NBA2, and thus, may have increased bendability. In addition, although FIG. 3B illustrates a view corresponding to the cross-sectional view of the display device DD of FIG. 1A, the protection layer PLa might not be disposed on the first and second bending areas BA1 and BA2 of the display device DD-1 of FIG. 2.

In an exemplary embodiment of the present inventive concept, a plastic film may be separately attached to an area overlapping the bending area BA where the protection layer PLa is not disposed.

Figure 3C:
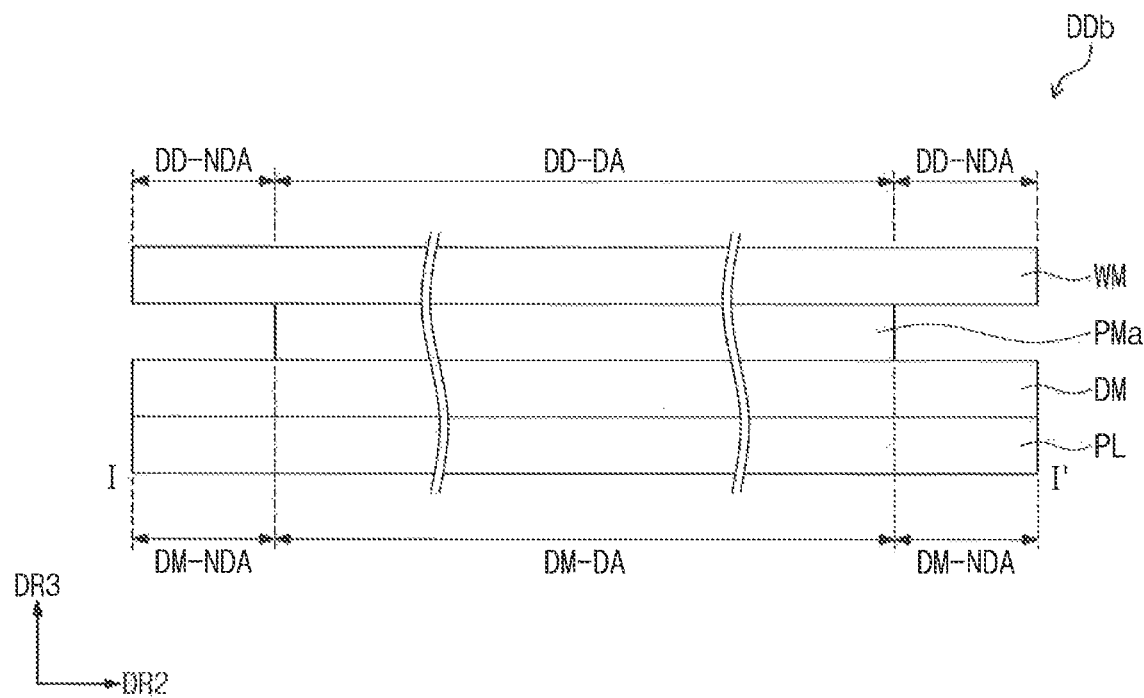
FIG. 3C is a schematic cross-sectional view of a display device taken along line I-I' of FIG. 1A according to an exemplary embodiment of the present inventive concept.

FIG. 3C is a cross-sectional view of a display device DDb taken along line I-I' of FIG. 1A according to an exemplary embodiment of the present inventive concept. In a description of FIG. 3C, the same reference numeral may be given to components and/or elements that are the same as those of FIG. 3A, and with regard to the components and/or elements that are the same as those in FIG. 3A, their detailed descriptions may be omitted.

Referring to FIG. 3C, the display module DM includes a display area DM-DA on which an image is displayed and a non-display area DM-NDA on which an image is not displayed. The display area DM-DA and the non-display area DM-NDA of the display module DM may correspond to the display area DD-DA and the non-display area DD-NDA of the display device DDb, respectively. The display area DM-DA and the non-display area DM-NDA of the display module DM might not be the same as the display area DD-DA and the non-display area DD-NDA of the display device DDb. For example, each of the display area DM-DA and the non-display area DM-NDA of the display module DM may be changed according to a structure/design of the display device DDb.

Although the polarization member PM of FIGS. 3A and 3B overlaps the display area DM-DA and the non-display area DM-NDA as described above, the polarization member PMa of FIG. 3C may overlap only the display area DM-DA and might not overlap the non-display area DM-NDA. Since the polarization member PMa is formed on only the area corresponding to the display area DM-DA, manufacturing costs may be reduced.

Figure 3D:
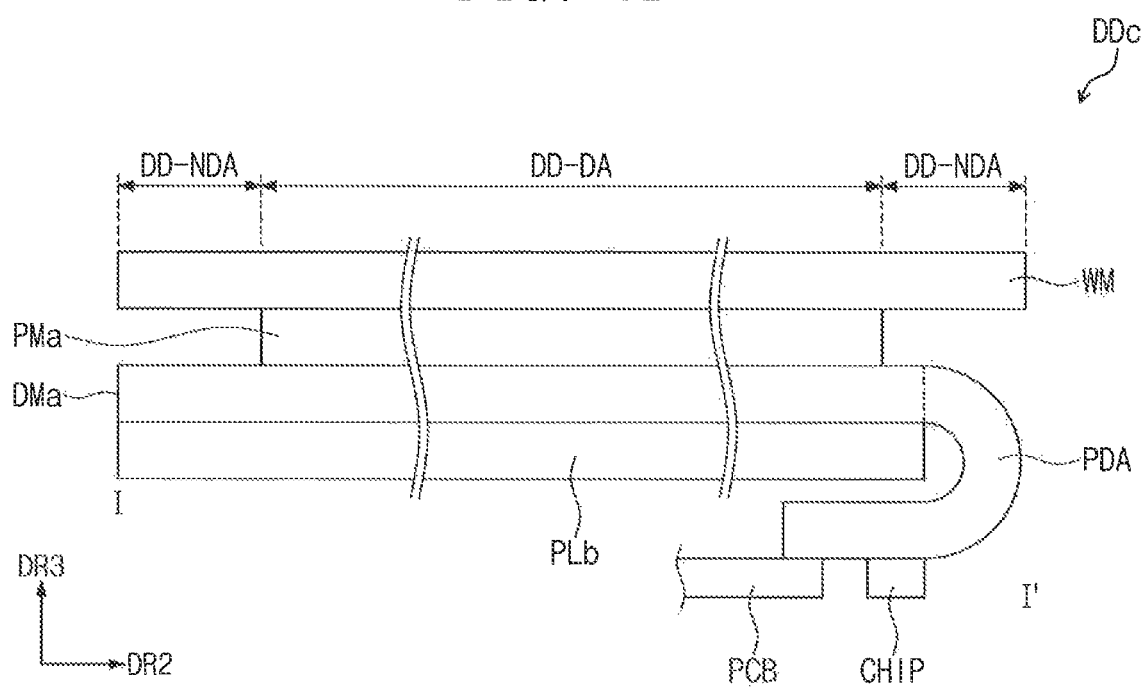
FIG. 3D is a schematic cross-sectional view of a display device taken along line I-I' of FIG. 1A according to an exemplary embodiment of the present inventive concept.

FIG. 3D is a cross-sectional view of a display device DDc taken along line I-I' of FIG. 1A according to an exemplary embodiment of the present inventive concept. In description of FIG. 3D, the same reference numeral may be given to components and/or elements that are the same as those of FIG. 3A, and with regard to the components and/or elements that are the same as those in FIG. 3A, their detailed descriptions may be omitted.

Referring to FIG. 3D, a display module DMa may further include a pad area PDA. The pad area PDA may be a portion of the display module DMa corresponding to the non-display area DM-NDA (see, e.g., FIG. 3C). The pad area PDA may be bent in a direction that is away from the window WM. According to the current embodiment, a tape carrier package, on which a driving chip attached to the non-display area DM-NDA (see, e.g., FIG. 3C) of the display module DMa is mounted, may be omitted to reduce a width of the non-display area DD-NDA.

Although the pad area PDA is illustrated in FIG. 3D, portions (e.g., a base layer and a circuit layer) of all the components constituting the display module DMa may constitute the pad area PDA.

A driving chip CHIP may be mounted on the pad area PDA of the display module DMa, and a printed circuit board PCB may be attached to the pad area PDA of the display module DMa to transmit a control signal for controlling the driving of the display module DMa.

FIG. 3D illustrates an example of a structure in which a protection layer PLb may partially overlap but not touch the pad area PDA. However, the present inventive concept is not limited thereto. For example, the protection layer PLb may be disposed to extend up to the pad area FDA. In addition, in an exemplary embodiment of the present inventive concept, a plastic film may be separately attached to a lower portion of the pad area PDA on which the protection layer PLb is not disposed.

In an exemplary embodiment of the present inventive concept, the protection layer PLb might not overlap the pad area PDA.

Figure 3E:
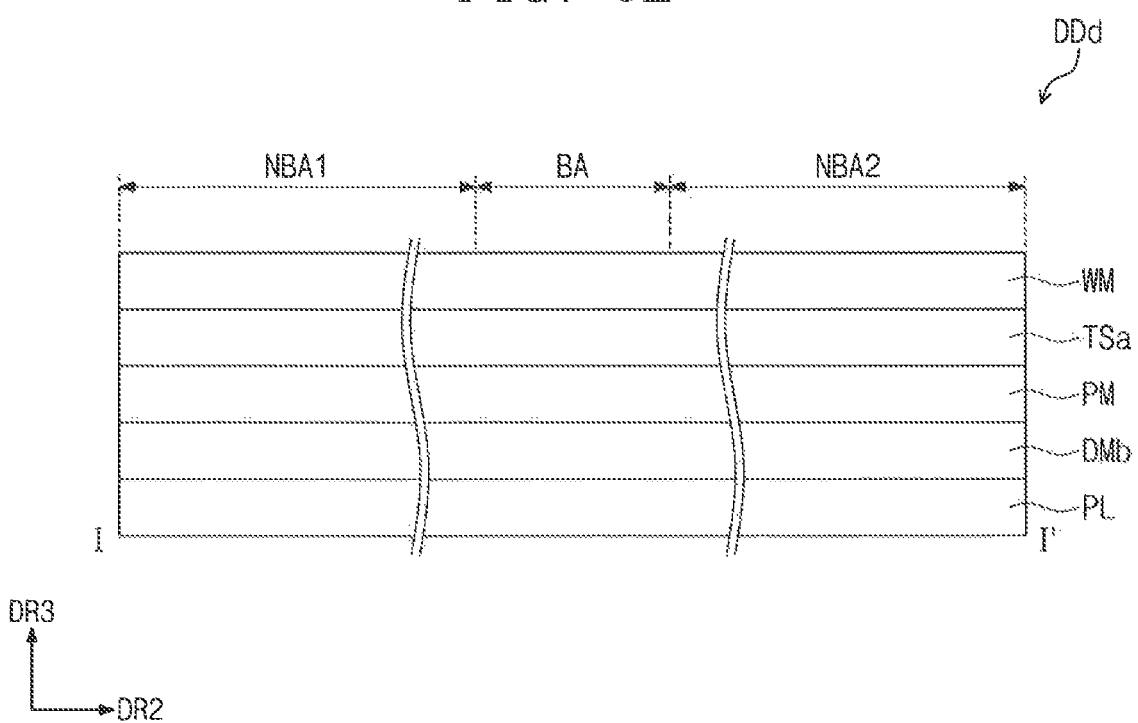
FIG. 3E is a schematic cross-sectional view of a display device, which is taken along line I-I' of FIG. 1A according to an exemplary embodiment of the present inventive concept.

FIG. 3E is a cross-sectional view of a display device DDd taken along line I-I' of FIG. 1A according to an exemplary embodiment of the present inventive concept. In a description of FIG. 3E, the same reference numeral may be given to components and/or elements that are the same as those of FIG. 3A, and with regard to the components and/or elements that are the same as those in FIG. 3A, their detailed descriptions may be omitted.

Referring to FIG. 3E, the display device DDd may further include a touch sensing unit TSa. The touch sensing unit TSa may be disposed between the window WM and the polarization member PM. The touch sensing unit TSa may adhere to only one of the polarization member PM and the window WM, or may adhere to both the polarization member PM and the window WM. The touch sensing unit TSa may be coupled to the polarization member PM or the window WM, or may be coupled to both the polarization member PM and the window WM by using an organic adhesive layer such as an optically clear adhesive film (OCA), an optically clear resin (OCR), or a pressure sensitive adhesive film (PSA). In addition, the display device DDd includes the display module DMb.

Figure 4:
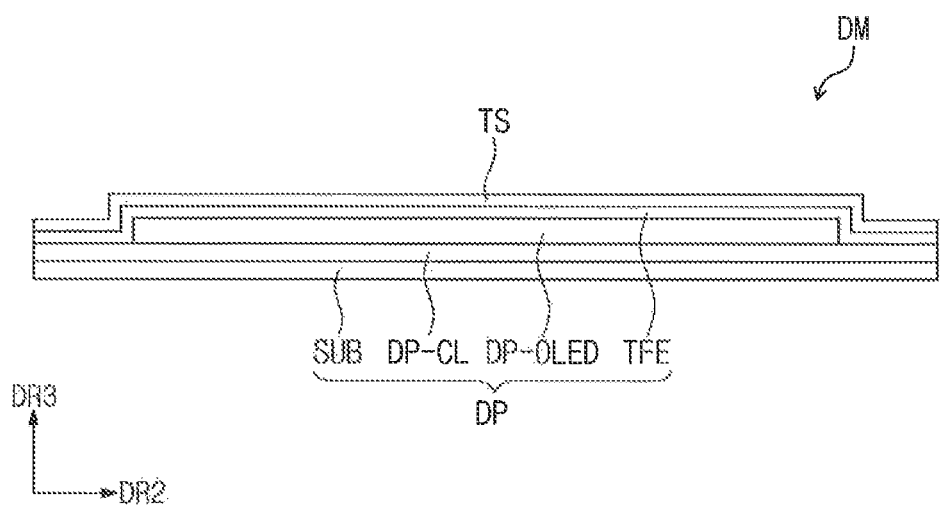
FIG. 4 is a cross-sectional view of a display module according to an exemplary embodiment of the present inventive concept.

FIG. 4 is a cross-sectional view of the display module DM according to an exemplary embodiment of the present inventive concept. FIG. 4 illustrates a more detailed cross-sectional view of the display module DM of FIGS. 3A to 3D.

Referring to FIG. 4, the display module DM may include a display panel DP and a touch sensing unit TS. In FIG. 4, an organic light emitting display panel is representatively described as an example of the display panel DP. However, the present inventive concept is not limited thereto. For example, the display panel DP may be a liquid crystal display panel, a plasma display panel, or an electrophoretic display panel.

The display panel DP includes a base layer SUB, a circuit layer DP-CL disposed on the base layer SUB, a light emitting device layer DP-OLED, and a thin film encapsulation layer TFE.

The base layer SUB may include a plastic substrate, a glass substrate, a metal substrate, or an organic/inorganic composite substrate as a flexible substrate. The plastic substrate may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

The circuit layer DP-CL may include a plurality of insulation layers, a plurality of conductive layers, and a semiconductor layer. The plurality of conductive layers of the circuit layer DP-CL may constitute signal lines and/or a control circuit of a pixel.

The light emitting device layer DP-OLED may include organic light emitting diodes.

The thin film encapsulation layer TFE seals the light emitting device layer DP-OLED. For example, the thin film encapsulation layer TFE overlaps the light emitting device layer DP-OLED. The thin film encapsulation layer TFE may include a plurality of inorganic thin films and at least one organic thin film disposed between the inorganic thin films. The inorganic thin films may protect the light emitting device layer DP-OLED against moisture/oxygen, and the organic thin film may protect the light emitting device layer DP-OLED against foreign substances such as dust particles.

The touch sensing unit TS includes touch sensors and touch signal lines. The touch sensors and the touch signal lines may have a single layer or multilayered structure. Each of the touch sensors and the touch signal lines may include indium tin oxide (ITO), indium zinc oxide (IZO), zinc oxide (ZnO), or indium tin zinc oxide (ITZO), PEDOT, a metal nano wire, and/or graphene. Each of the touch sensors and the touch signal lines may include a metal layer, for example, molybdenum, silver, titanium, copper, aluminum, and an alloy thereof. The touch sensors and the touch signal lines may have the same single layer structure or may have single layer structures different from each other.

The touch sensing unit TS may be disposed on the display panel DP. As an example, the touch sensing unit TS may be directly disposed on the display panel DP. The term "directly disposed" means that a component is formed through a continuous process except that the component adheres to another component by using a separate adhesive layer. However, the present inventive concept is not limited thereto. For example, the touch sensing unit TS may be manufactured through a separate process and then may be coupled to another component by an organic adhesive layer such as an optically clear adhesive film (OCA), an optically clear resin (OCR), or a pressure sensitive adhesive film (PSA).

Figure 5A:
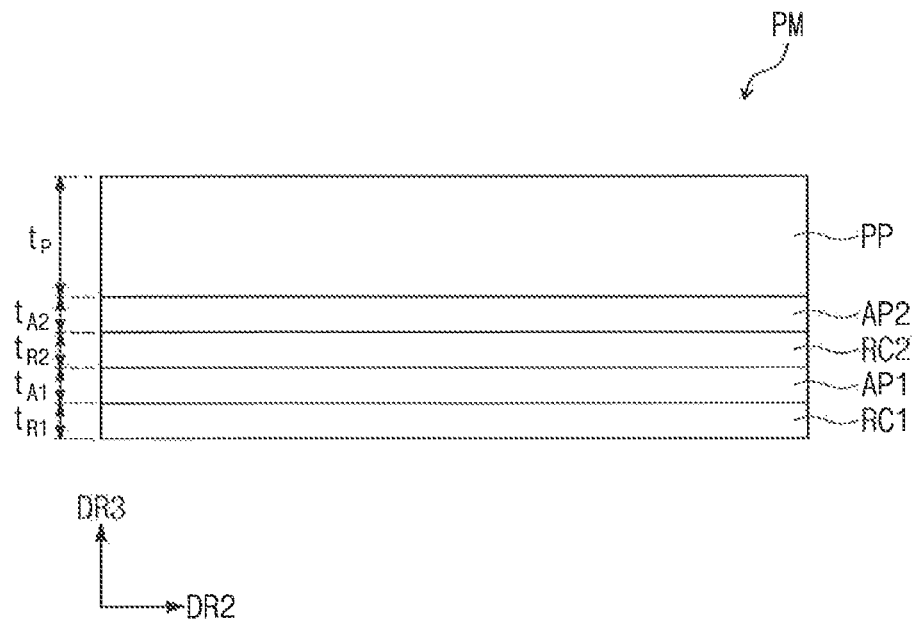
FIG. 5A is a cross-sectional view of a polarization member according to an exemplary embodiment of the present inventive concept.

FIG. 5A is a cross-sectional view of the polarization member PM according to an exemplary embodiment of the present inventive concept.

Referring to FIG. 5A, the polarization member PM may include a line polarizer PP, a λ/4 phase retardation layer RC1, a λ/2 phase retardation layer RC2, a first adhesion member AP1, and a second adhesion member AP2. The λ/4 phase retardation layer RC1 may be disposed adjacent to the display module DM (see, e.g., FIG. 3A). The λ/4 phase retardation layer RC1, the first adhesion member AP1, the λ/2 phase retardation layer RC2, the second adhesion member AP2, and the line polarizer PP may be successively laminated in the third direction DR3.

The line polarizer PP may be a polarizer that linearly polarizes provided light in one direction. The line polarizer PP may be a film type polarizer including an elongated polymer film. For example, the elongated polymer film may be a polyvinylalchol-based film.

The line polarizer PP may be manufactured by absorbing a dichroic dye to the elongated polymer film. For example, the line polarizer PP may be manufactured by absorbing iodine to the elongated polyvinylalchol film. Here, a direction in which the polymer film is elongated may become an absorption axis of the line polarizer PP, and a direction perpendicular to the elongated direction may be a transmission axis of the line polarizer PP.

The line polarizer PP may further include at least one protection layer. For example, a triacetyl cellulose (TAG) layer may be provided on at least one of top and bottom surfaces of the line polarizer PP. However, the present inventive concept is not limited thereto. For example, the line polarizer PP may further include a hard coating layer, an antireflection layer, or an anti-glare layer.

The λ/4 phase retardation layer RC1 may be an optical layer that retards a phase of provided light by λ/4. For example, when light provided to the λ/4 phase retardation layer RC1 has a wavelength of about 550 nm, the light passing through the λ/4 phase retardation layer RC1 may have a phase retardation value of about 137.5 nm.

In addition, the λ/4 phase retardation layer RC1 has an optical anisotropy to change a polarized state of light incident to the λ/4 phase retardation layer RC1. In other words, the light provided to the λ/4 phase retardation layer RC1 in the linearly polarized state may be changed into a circular polarized state, and the light provided to the λ/4 phase retardation layer RC1 in the circular polarized state may be changed into the linearly polarized state.

In an exemplary embodiment of the present inventive concept, a thickness direction (e.g., the third direction DR3) of the λ/4 phase retardation layer RC1 may be a z direction. In addition, a direction extending parallel to a surface of the λ/4 phase retardation layer RC1 may be an x direction, and another direction crossing the x direction may be a y direction. Further, the z direction is perpendicular to the x and y directions. The λ/4 phase retardation layer RC1 may be an A-plate having refractive indexes different from each other in the plane directions (e.g., x, y and z directions). For example, when a refractive index of the λ/4 phase retardation layer RC1 in the x direction is a first refractive index nx, a refractive index in the y direction is a second refractive index ny, and a refractive index in the third direction DR3 is a third refractive index nz, the first to third refractive indexes nx to nz may satisfy following [Equation 1].

$$nx \neq ny \approx nz \qquad \text{[Equation 1]}$$

In the λ/4 phase retardation layer RC1 according to an exemplary embodiment of the present inventive concept, the second and third refractive indexes ny and nz may be substantially the same. However, the present inventive concept is not limited thereto. For example, the second and third refractive indexes ny and nz may be different from each other.

A phase retardation layer such as the λ/4 phase retardation layer RC1 may have an in-plane phase retardation value Re and a phase retardation value Rth in the thickness direction. The in-plane phase retardation value Re and the phase retardation value Rth in the thickness direction may be calculated by following Equation 2. Reference symbol d in Equation 2 may represent a thickness of the phase retardation layer.

$$Re = (nx - ny) \times d$$

$$Rth = ((nx + ny)/2 - nz) \times d \qquad \text{[Equation 2]}$$

In the polarization member PM according to an exemplary embodiment of the present inventive concept, the λ/4 phase retardation layer RC1 may be a liquid crystal coating layer. The λ/4 phase retardation layer RC1 may be a liquid crystal coating layer manufactured by using a reactive liquid crystal monomer. The λ/4 phase retardation layer RC1 may be manufactured through a process in which the reactive liquid crystal monomer is coated, aligned, and polymerized. For example, the liquid crystal monomer used for the λ/4 phase retardation layer RC1 may be a rod-like nematic phase. For example, the λ/4 phase retardation layer RC1 may be a nematic liquid crystal coating layer.

The λ/4 phase retardation layer RC1 may be disposed on the outermost portion of the polarization member PM, and thus, relatively large stress may be applied to the λ/4 phase retardation layer RC1 when compared to other components of the polarization member PM. The nematic liquid crystal may be more strongly coupled to a binder when compared to a discotic liquid crystal. Thus, when the λ/4 phase retardation layer RC1 is realized as the nematic liquid crystal coating layer, durability against the stress may be increased. For example, the λ/4 phase retardation layer RC1 may be constituted by only the liquid crystal coating layer without using a base material that is a supporting material. The λ/4 phase retardation layer RC1 constituted by only the liquid crystal coating layer without using the base material may be used as the polarization member PM to reduce the total thickness of the flexible display device DD. In other words, the polarization member PM may be reduced in thickness by using the λ/4 phase retardation layer RC1 that includes the liquid crystal coating layer, and thus, the flexible display device DD may have increased bendability, The λ/4 phase retardation layer RC1, for example, the liquid crystal layer may have a thickness $t_{R1}$ of about 0.5 micrometers to about 5 micrometers. For example, the λ/4 phase retardation layer RC1 may have a thickness $t_{R1}$ of about 0.5 micrometers to about 2 micrometers. When the λ/4 phase retardation layer RC1 has a thickness $t_{R1}$ of about 0.5 micrometers or less, optical characteristics within the λ/4 phase retardation layer RC1 might not be uniform. In addition, when the λ/4 phase retardation layer RC1 has a thickness $t_{R1}$ of about 0.5 micrometers or more, the thickness of the polarization member PM might not be reduced such that the flexible display device DD may have increased bendability.

A first adhesion member AP1 may be disposed between the λ/4 phase retardation layer RC1 and the line polarizer PP. The first adhesion member AP1 may be an adhesive layer having a glass transition temperature of about 40° C. to about 150° C. The first adhesion member AP1 may have the glass transition temperature greater than room temperature to increase coupling strength between the λ/4 phase retardation layer RC1 and the line polarizer PP.

The first adhesion member AP1 may be an adhesive layer that is in a cross-linked state through an ultraviolet (UV) curing or thermosetting process. The first adhesion member AP1 may be an adhesive layer including at least one of an acrylic-based resin, a silicon resin, urethane-based resin, or an epoxy-based resin.

The first adhesion member AP1 may include a UV curable adhesive. The first adhesion member AP1 may be an adhesive layer that is polymerized and cured through at least one reaction of radical polymerization reaction and cathionic polymerization reaction.

The adhesive layer constituting the first adhesion member AP1 may be made of an adhesion composition including a cathionic polymerization compound. For example, the adhesion composition may include at least one of an epoxy compound, an ether compound, an oxetane compound, an oxolane compound, a cyclic acetal compound, a cyclic lactone compound, a tiran compound, a thiovinlyether compound, a spirorthoester compound, an ethylenic unsaturated compound, a cyclic ether compound, or a cyclic thioether compound.

In addition, the adhesive layer constituting the first adhesion member AP1 may be made of an adhesion composition including a radical polymerization compound having a radical polymerization reactor. For example, the radical polymerization compound may be an acryl-based compound, such as a methacrylate compound.

The adhesion composition forming the first adhesion member AP1 may include an optical initiator. In addition, the adhesion composition may further include an additive such as a photosensitizer, a silane coupling agent, a plasticizer, and an anti-former in addition to the optical initiator.

The first adhesion member AP1 may have a thickness $t_{A1}$ of about 0.1 micrometers to about 5 micrometers. For example, the first adhesion member AP1 may have a thickness $t_{A1}$ of about 0.5 micrometers to about 3 micrometers. When the first adhesion member AP1 has a thickness $t_{A1}$ of about 0.1 micrometers or less, delamination of the first adhesion member AP1 may occur when the display device is bent since the adhesion strength for coupling the line polarizer PP to the λ/4 phase retardation layer RC1 is not obtained. In addition, when the first adhesion member AP1 has a thickness $t_{A1}$ of about 5 micrometers or more, the thickness of the polarization member PM might not be reduced such that the flexible display device DD may have increased bendability. Thus, cracks in the phase retardation layer (e.g., λ/4 phase retardation layer RC1 and λ/2 phase retardation layer RC2) that is adjacent to the first adhesion member AP1 may occur under the high-temperature reliability condition.

In the polarization member PM according to an exemplary embodiment of the present inventive concept, the sum of the thickness $t_{A1}$ of the first adhesion member AP1 and the thickness $t_{R1}$ of the λ/4 phase retardation layer RC1 may be less than a thickness $t_P$ of the line polarizer PP. In other words, in an exemplary embodiment of the present inventive concept, the liquid crystal coating layer may be formed as the λ/4 phase retardation layer RC1 and the first adhesion member AP1 may be made of the adhesion composition to reduce the total thickness of the polarization member PM.

In addition, the adhesive layer having the glass transition temperature of about 40° C. to about 150° C. may be formed as the first adhesion member AP1 to maintain the adhesion strength between the line polarizer PP and the λ/4 phase retardation layer RC1. In addition, when the flexible display device is folded or bent, deformation of the first adhesion member AP1 might not occur, and thus, the λ/4 phase retardation layer RC1 adjacent to the first adhesion member AP1 may be prevented from being deformed, and accordingly, may prevent the flexible display device DD from deteriorating in quality due to the deformation of the λ/4 phase retardation layer RC1.

The λ/2 phase retardation layer RC2 may be a liquid crystal coating layer. The λ/2 phase retardation layer RC2 may be a liquid crystal coating layer manufactured by using a reactive liquid crystal monomer. The λ/2 phase retardation layer RC2 may be manufactured through a process in which the reactive liquid crystal monomer is coated, aligned, and polymerized. For example, the liquid crystal monomer used for the λ/2 phase retardation layer RC2 may have a disc-like discotic phase. The λ/2 phase retardation layer RC2 may be a discotic liquid crystal coating layer.

The λ/2 phase retardation layer RC2 may be constituted by, for example, only the liquid crystal coating layer without using a base material that is a supporting material. For example, the λ/2 phase retardation layer RC2 constituted by only the liquid crystal coating layer without using the base material may be provided in the polarization member PM to reduce the total thickness of the flexible display device DD. In other words, the polarization member PM may be reduced in thickness by using the λ/2 phase retardation layer RC2 that includes the liquid crystal coating layer, and thus, the flexible display device DD may have increased bendability.

The λ/2 phase retardation layer RC2 that is the liquid crystal layer may have a thickness $t_{R2}$ of about 0.5 micrometers to about 5 micrometers. For example, the λ/2 phase retardation layer RC2 may have a thickness $t_{R2}$ of about 0.5 micrometers to about 2 micrometers. In addition, the λ/2 phase retardation layer RC2 may have a thickness $t_{R2}$ that is equal to or different from the thickness $t_{R1}$ of the λ/4 phase retardation layer RC1. For example, the λ/2 phase retardation layer RC2 may have a thickness $t_{R2}$ that is greater than the thickness $t_{R1}$ of the λ/4 phase retardation layer RC1.

When the λ/2 phase retardation layer RC2 has a thickness $t_{R2}$ of about 0.5 micrometers or less, optical characteristics within the phase retardation layer might not be uniform. In addition, when the λ/2 phase retardation layer RC2 has a thickness $t_{R2}$ of about 0.5 micrometers or more, the thickness of the polarization member PM might not be reduced such that the flexible display device DD may have increased bendability.

One of the phase retardation value of the λ/4 phase retardation layer RC1 in the thickness direction and the phase retardation value of the λ/2 phase retardation layer RC2 in the thickness direction may have a positive value, and the other one (e.g., the remaining phase retardation layer) may have a negative value. For example, the λ/4 phase retardation layer RC1 may be a posi-A-plate, and the λ/2 phase retardation layer RC2 may be a nega-A-plate.

In Equation 1 above, in a case of nx>ny, the phase retardation layer may be the posi-A-plate. In addition, in a case of nx<ny, the phase retardation layer may be the nega-A-plate. Thus, in case of the posi-A-plate, the phase retardation value in the thickness direction may have a positive value. In addition, in a case of the nega-A-plate, the phase retardation value in the thickness may have a negative value. Thus, the phase difference in the thickness direction may be offset and reduced. Therefore, according to an exemplary embodiment of the present inventive concept, since the phase retardation values of the λ/4 phase retardation layer RC1 and the λ/2 phase retardation layer RC2 in the thickness direction are different from each other, a variation in phase difference due to the viewing angle may be reduced. Thus, the color shift may be reduced to increase the display quality.

The second adhesion member AP2 may be disposed between the λ/2 phase retardation layer RC2 and the line polarizer PP to couple the λ/2 phase retardation layer RC2 to the line polarizer PP. The second adhesion member AP2 may be a pressure sensitive adhesive layer having a glass transition temperature of about −35° C. to about 0° C. or an adhesive layer having a glass transition temperature of about 40° C. to about 150° C.

In addition, since the pressure sensitive adhesive layer has the glass transition temperature less than room temperature, the pressure sensitive adhesive layer may be an adhesion member having tackiness at room temperature. In addition, if the pressure sensitive adhesive layer has the glass transition temperature greater than room temperature, the pressure sensitive adhesive layer may be an adhesion member that does not have the tackiness at room temperature. The pressure sensitive adhesive layer may be an adhesion member having a modulus value that is relatively less than that of the adhesive layer.

The pressure sensitive adhesive layer may be made of a pressure sensitive adhesive composition including at least one of an acryl-based pressure sensitive adhesive, a silicon-based pressure sensitive adhesive, an epoxy-based pressure sensitive adhesive, or a rubber-based pressure sensitive adhesive. The pressure sensitive adhesive composition may further include an additive such as a silane coupling agent, a tackifying resin, a hardener, a UV stabilizer, and a filler.

The adhesive layer may be made of an adhesive composition including at least one of an acryl-based resin, a silicon-based resin, a urethane-based resin, or an epoxy-based resin. For example, the adhesive layer and the pressure sensitive adhesive layer may be made of an acryl-based compound. In addition, the adhesive layer and the pressure sensitive adhesive layer may be adhesion members having polymerized degrees or cross-linked degrees different from each other.

For example, when the second adhesion member AP2 is the pressure sensitive adhesive layer, the second adhesion member AP2 may have a property of being softer at room temperature when compared to the first adhesion member AP1. When the second adhesion member AP2 is the pressure sensitive adhesive layer, the second adhesion member AP2 may have a modulus less than that of the first adhesion member AP1.

When the second adhesion member AP2 is the pressure sensitive adhesive layer, the second adhesion member AP2 may be the same as the first adhesion member AP1. In addition, the second adhesion member AP2 may be an adhesive layer having a modulus value different from that of the first adhesion member AP1.

The second adhesion member AP2 may have a thickness $t_{A2}$ of about 0.1 micrometers to about 5 micrometers. For example, the second adhesion member AP2 may have a thickness $t_{A2}$ of about 0.5 micrometers to about 3 micrometers. When the second adhesion member AP2 has a thickness $t_{A2}$ of about 0.1 micrometers or less, delamination of the second adhesion member AP2 may occur when the display device is bent since the adhesion strength for coupling the line polarizer PP to the λ/2 phase retardation layer RC2 is not obtained. For example, when the second adhesion member AP2 has a thickness $t_{A2}$ of about 5 micrometers or more, the thickness of the polarization member PM might not be reduced such that the flexible display device DD may have increased bendability.

The line polarizer PP may have a thickness $t_P$ that is greater than the sum of the thickness $t_{R2}$ of the λ/2 phase retardation layer RC2, the thickness $t_{A2}$ of the second adhesion member AP2, the thickness $t_{R1}$ of the λ/4 phase retardation layer RC1 and the thickness $t_{A1}$ of the first adhesion member AP1.

Figure 5B:
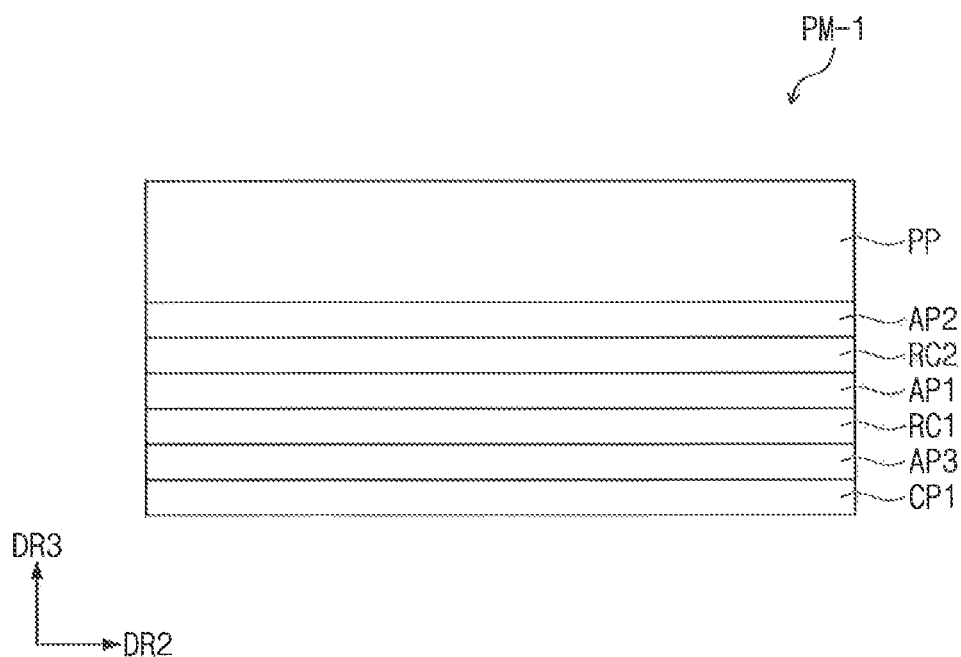
FIG. 5B is a cross-sectional view of a polarization member according to an exemplary embodiment of the present inventive concept.

FIG. 5B is a cross-sectional view of a polarization member PM-1 according to an exemplary embodiment of the present inventive concept.

Referring to FIG. 5B, a polarization member PM-1 according to an exemplary embodiment of the present inventive concept may include an optical compensation layer CP1 in addition to the λ/4 phase retardation layer RC1, the line polarizer PP, and the λ/2 phase retardation layer RC2. In an exemplary embodiment present inventive concept, the optical compensation layer CP1 may be disposed on a bottom surface of the λ/4 phase retardation layer RC1. In other words, the optical compensation layer CP1 may be disposed adjacent to the display module DM (see, e.g., FIG. 3A). In an exemplary embodiment of the present inventive concept, the polarization member PM may include the optical compensation layer CP1, the λ/4 phase retardation layer RC1, the λ/2 phase retardation layer RC2, and the line polarizer PP, which are laminated in the third direction DR3.

The optical compensation layer CP1 may be an optical functional layer that compensates a difference in phase retardation value Rth of the λ/4 phase retardation layer RC1 and the λ/2 phase retardation layer RC2 in the thickness direction. The optical compensation layer CP1 may be a C-plate. For example, when a refractive index of the optical compensation layer CP1 in the x direction of plane directions of the optical compensation layer CP1 is a first refractive index nx, a refractive index in the y direction of the plane directions is a second refractive index ny, and a refractive index in the z direction, which is the thickness direction, of the plane directions is a third refractive index nz, the first to third refractive indexes nx to nz may satisfy following [Equation 3].

$$nx \approx ny \neq nz \qquad [\text{Equation 3}]$$

In the optical compensation layer CP1 according to an exemplary embodiment of the present inventive concept, the first and second refractive indexes nx and ny may be substantially the same. However, the present inventive concept is not limited thereto. For example, the first and second refractive indexes nx and ny may be different from each other.

The optical compensation layer CP1 may be a negative C-plate or a positive C-plate. For example, when the sum of the phase retardation value of the λ/4 phase retardation layer RC1 in the thickness direction and the phase retardation value of the λ/2 phase retardation layer RC2 in the thickness direction has a negative (−) value, the optical compensation layer CP1 may be the positive C-plate. In addition, when the sum of the phase retardation value of the λ/4 phase retardation layer RC1 in the thickness direction and the phase retardation value of the λ/2 phase retardation layer RC2 in the thickness direction has a positive (+) value, the optical compensation layer CP1 may be the negative C-plate. The optical compensation layer CP1 may have the form of a solidified layer or a cured layer of a liquid crystal composition including a liquid crystal compound.

A third adhesion member AP3 may be disposed between the optical compensation layer CP1 and the λ/4 phase retardation layer RC1. The third adhesion member AP3 may be a pressure sensitive adhesive layer having a glass transition temperature of about −35° C. to about 0° C. or an adhesive layer having a glass transition temperature of about 40° C. to about 150° C. The above-described descriptions of the second adhesion member AP2 of FIG. 5A may be applied to the description of third adhesion member AP3 since the third adhesion member AP3 is substantially the same as the second adhesion member AP2 of FIG. 5A.

In the polarization member PM of FIG. 5A, the first adhesion member AP1 may be an adhesive layer having a glass transition temperature of about 40° C. to about 150° C., and each of the second and third adhesion members AP2 and AP3 may be a pressure sensitive adhesive layer having a glass transition temperature of about −35° C. to about 0° C. or an adhesive layer having a glass transition temperature of about 40° C. to about 150° C. For example, one of the second and third adhesion members AP2 and AP3 may be the pressure sensitive adhesive layer, and the other one may be the adhesive layer. In addition, the second and third adhesion members AP2 and AP3 may be the adhesive layers, or the second and third adhesion members AP2 and AP3 may be the pressure sensitive adhesive layers.

Although the optical compensation layer CP1 is disposed on the bottom surface of the λ/4 phase retardation layer RC1 in FIG. 5B, the present inventive concept is not limited to the position of the optical compensation layer CP1. For example, the optical compensation layer CP1 may be disposed between the λ/4 phase retardation layer RC1 and the λ2 phase retardation layer RC2.

Figure 6A:
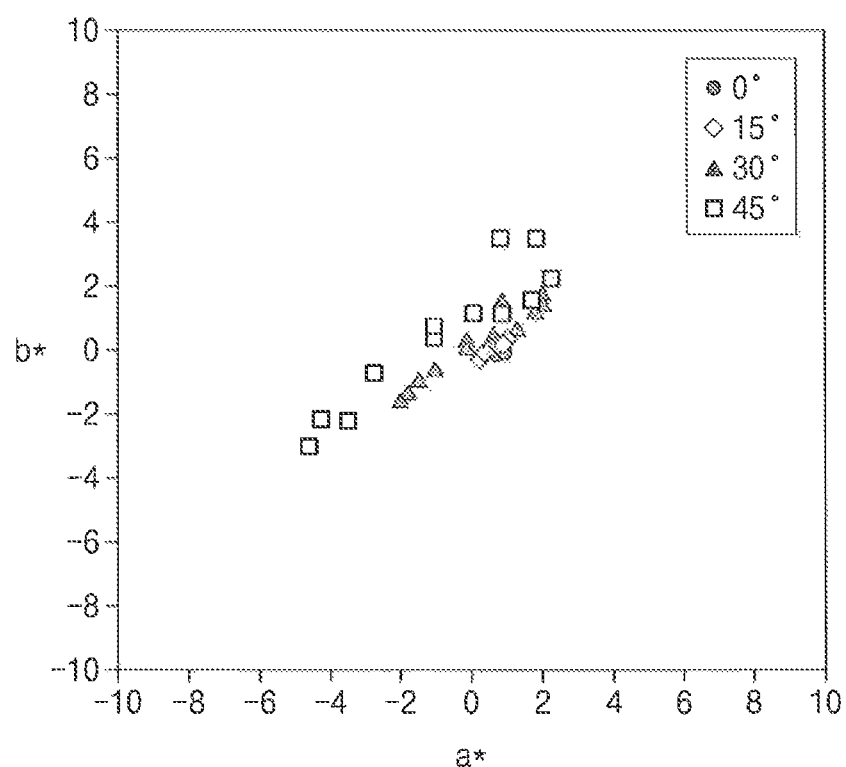
FIG. 6A is a graph of a variation in color coordinates depending on a viewing angle and an azimuth according to a comparative example of the present inventive concept.
Figure 6B:
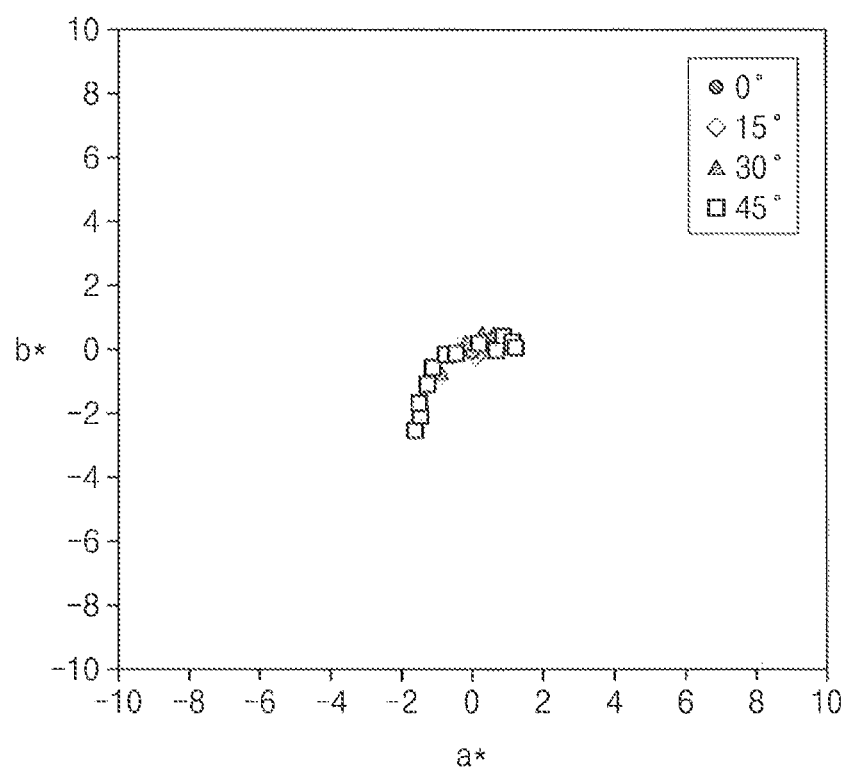
FIG. 6B is a graph of a variation in color coordinates depending on a viewing angle and an azimuth according to an exemplary embodiment of the present inventive concept.

FIG. 6A is a graph of a variation in color coordinates depending on a viewing angle and an azimuth according to a comparative example of the present inventive concept, and FIG. 6B is a graph of a variation in color coordinates depending on a viewing angle and an azimuth according to an exemplary embodiment of the present inventive concept. FIG. 6A is a graph when the λ/4 phase retardation layer and the λ/2 phase retardation layer are the discotic liquid crystal coating layers, and FIG. 6B is a graph when the λ/4 phase retardation layer RC1 is the nematic liquid crystal coating layer, and the λ/2 phase retardation layer RC2 is the discotic liquid crystal coating layer.

Referring to FIGS. 5, 6A, and 6B, as a value a* of an x axis approaches a value −10, a green color is expressed, and as the value a* of the x axis approaches a value +10, a red color is expressed. In addition, as a value b* of a y axis approaches a value −10, a blue color is expressed, and as the value b* of the y axis approaches a value +10, a yellow color is expressed. When each of the value a* and the value b* is 0, a color is closer to a black color.

A viewing angle represents an angle formed with respect to a normal direction of the display device. For example, when the display device is viewed from a front side, the viewing angle may be about 0 degree. FIGS. 6A and 6B illustrate a color shift when the viewing angle is about 0 degree, about 15 degrees, about 30 degrees, and about 45 degrees. In a case of the same viewing angle (e.g., about 0 degree, about 15 degrees, about 30 degrees, or about 45 degrees), the measured color coordinate is displayed by using the same reference symbols in FIGS. 6A and 6B.

FIGS. 6A and 6B are graphs of values obtained by measuring color coordinates, according to an azimuth, by irradiating light having a wavelength similar to that of the solar light onto the display device when the display device that is in a flat state is turned off (for example, an image non-display state). For example, points having the same configuration displayed on the graphs represent a color coordinate measured according to a variation of the azimuth with respect to the display device at the same viewing angle. For example, an object (for example, the display device) to be observed may be fixed, and a measuring device (for example, a device for analyzing electron optical properties of the display device according to angles) having a predetermined poloidal angle may rotate around the object to be observed to measure the color coordinates. The rotation of the measuring device around the object to be observed may correspond to a variation in azimuth, and the predetermined poloidal angle of the measuring device corresponds to the viewing angle. However, the measuring method is not limited to the above-described measuring method. For example, the measuring device may be fixed in a position (e.g., azimuth), and the object to be observed may rotate to measure the resultant color coordinates.

Referring to FIG. 6A, when the viewing angle is about 0 degree, a deviation of the color coordination in the turn-off state is not large. Thus, the color shift characteristics may be good. However, as the viewing angle increases, a deviation of the color coordination in the turn-off state may increase. In a case of the viewing angle of about 45 degrees, the value a* was measured to have a value ranging from about −4.8 to about 2.2, and the value b* was measured to have a value ranging from about −3.2 to about 3.8 according to the azimuth. However, when referring to the graph of FIG. 6B according to an exemplary embodiment of the present inventive concept, in a case of the viewing angle of about 45 degrees, the value a* was measured to have a value ranging from about −1.9 to about 1.7, and the value b* was measured to have a value ranging from about −2.5 to about 1 according to the azimuth. In other words, when compared to the comparative example (see, e.g., FIG. 6A) in which each of the λ/4 phase retardation layer and the λ/2 phase retardation layer includes the discotic liquid crystal layer, it was seen that the color shift may be reduced in a case of the present inventive concept in which the λ/4 phase retardation layer RC1 includes the nematic liquid crystal layer and the λ/2 phase retardation layer RC2 includes the discotic liquid crystal layer.

According to an exemplary embodiment of the present inventive concept, since the phase retardation value of the λ/4 phase retardation layer RC1 in the thickness direction has a positive value, and the phase retardation value of the λ/2 phase retardation layer RC2 in the thickness direction has a negative value, a phase difference in the thickness direction may be offset and reduced. Thus, when a case of an exemplary embodiment of the present inventive concept is compared to a case in which the λ/4 phase retardation layer and the λ/2 phase retardation layer respectively include liquid crystals the same as each other, like the comparative example, the phase difference in the thickness direction may be reduced in the case of the present inventive concept. Thus, the color shift according to the viewing angle may be reduced.

Figure 7A:
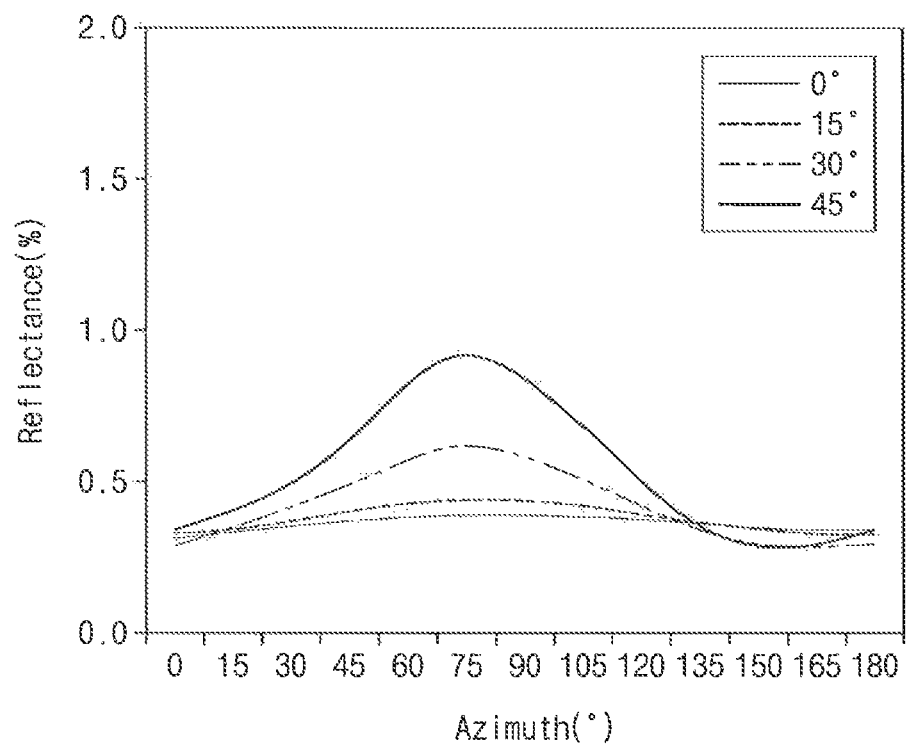
FIG. 7A is a graph of reflectance depending on an azimuth according to the comparative example of the present inventive concept.
Figure 7B:
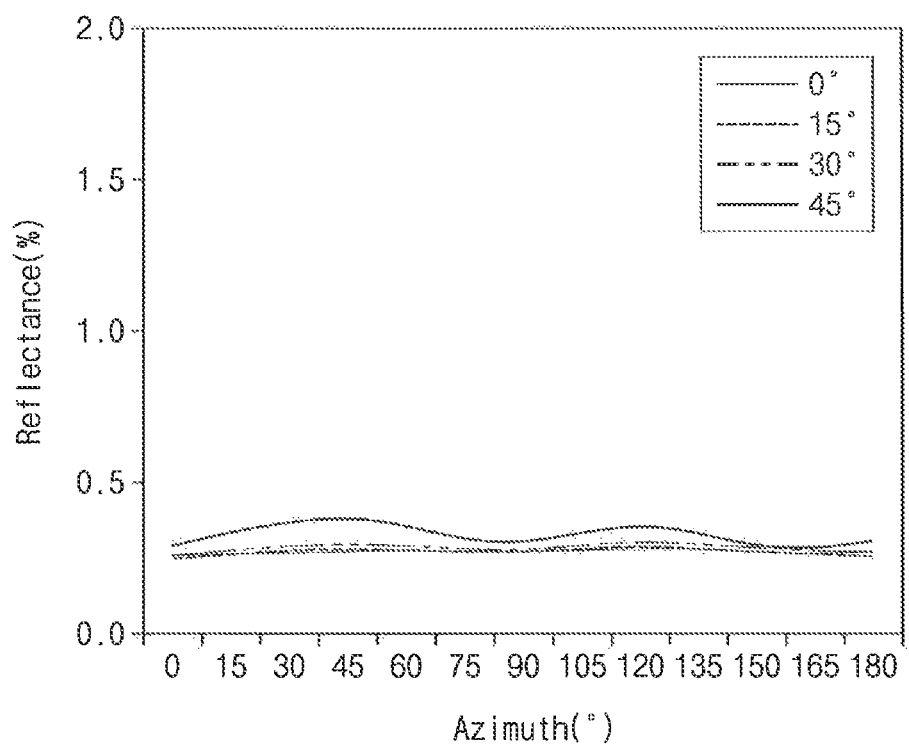
FIG. 7B is a graph of reflectance depending on an azimuth according to an exemplary embodiment of the present inventive concept.

FIG. 7A is a graph of reflectance depending on the azimuth according to the comparative example of the present inventive concept, and FIG. 7B is a graph of reflectance depending on the azimuth according to an exemplary embodiment of the present inventive concept. For example, FIG. 7A is a graph when the λ/4 phase retardation layer and the λ/2 phase retardation layer are the discotic liquid crystal coating layers, and FIG. 7B is a graph when the λ/4 phase retardation layer RC1 is the nematic liquid crystal coating layer and the λ/2 phase retardation layer RC2 is the discotic liquid crystal coating layer. FIGS. 7A and 7B illustrate graphs obtained by measuring a variation in reflectance when the azimuth varies at viewing angles of about 0 degree, about 15 degrees, about 30 degrees, and about 45 degrees.

FIGS. 7A and 7B are graphs of values obtained by measuring reflectance, according to viewing angles and azimuths, by irradiating light having a wavelength similar to that of solar light onto the display device when the display device is turned off (for example, an image non-display state). For example, the display device may be in a flat state.

The color coordinates of FIGS. 6A and 6B and the reflectance of FIGS. 7A and 7B may be measured at the same time by using the same equipment. For example, the measuring device may obtain the reflectance data to derive the graphs of FIGS. 7A and 7B and also calculate color values according to the reflectance data for respective wavelengths to derive the graphs of FIGS. 6A and 6B. However, present inventive concept is not limited thereto.

Referring to FIGS. 7A and 7B, in a case of the viewing angle of about 0 degree, a variation in reflectance maty be desired to a level of about 0.2% or less even though the azimuth varies. According to the comparative example, in a case of the viewing angle of about 45 degrees, the reflectance varies to about 0.5% or more at the azimuths of about 75 degrees to about 90 degrees. In this case, external light may be reflected to reduce a contrast ratio. However, according to an exemplary embodiment of the present inventive concept, even in a case of the viewing angle of about 45 degrees, the variation in reflectance may be maintained to the level of about 0.2% or less. Thus, since the external light incident to the display device is not emitted to the outside of the display device and, thus, is not seen by the user even though the azimuth and the viewing angle vary, the contrast ratio may be increased.

Figure 8:
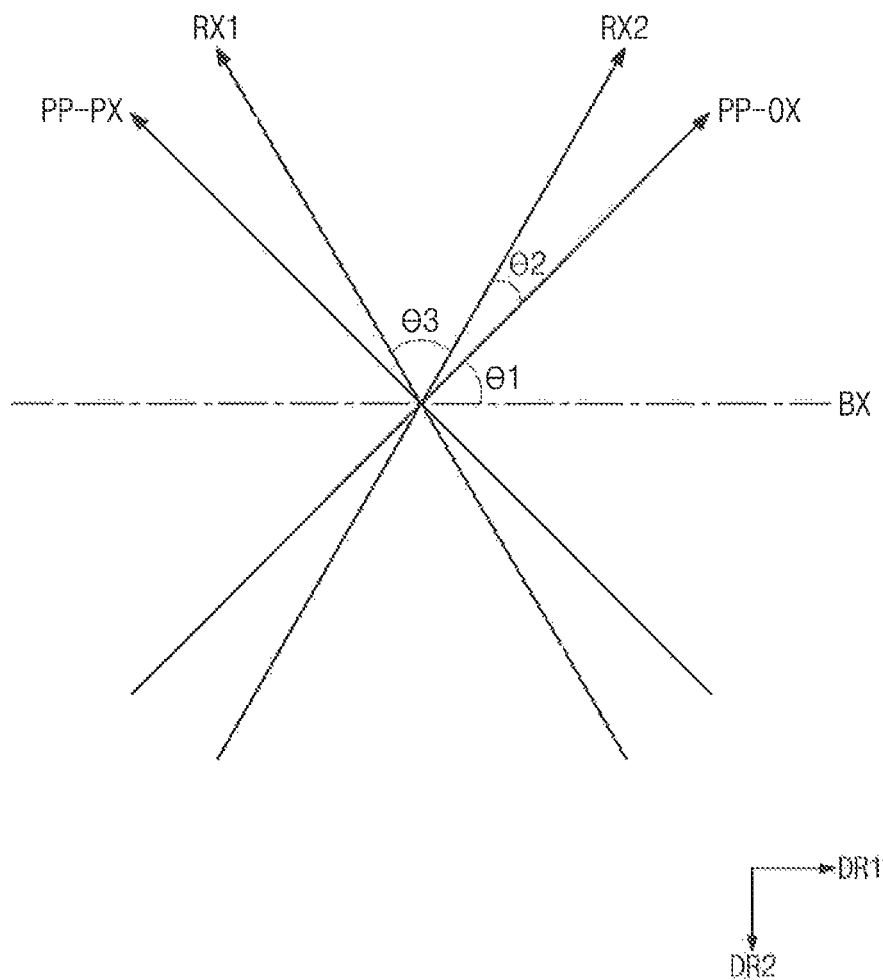
FIG. 8 is a view illustrating a relationship between an absorption axis and a transmission axis of a line polarizer, a first optical axis of a λ/4 phase retardation layer, and a second optical axis of a λ/2 phase retardation layer according to an exemplary embodiment of the present inventive concept.
Figure 9:
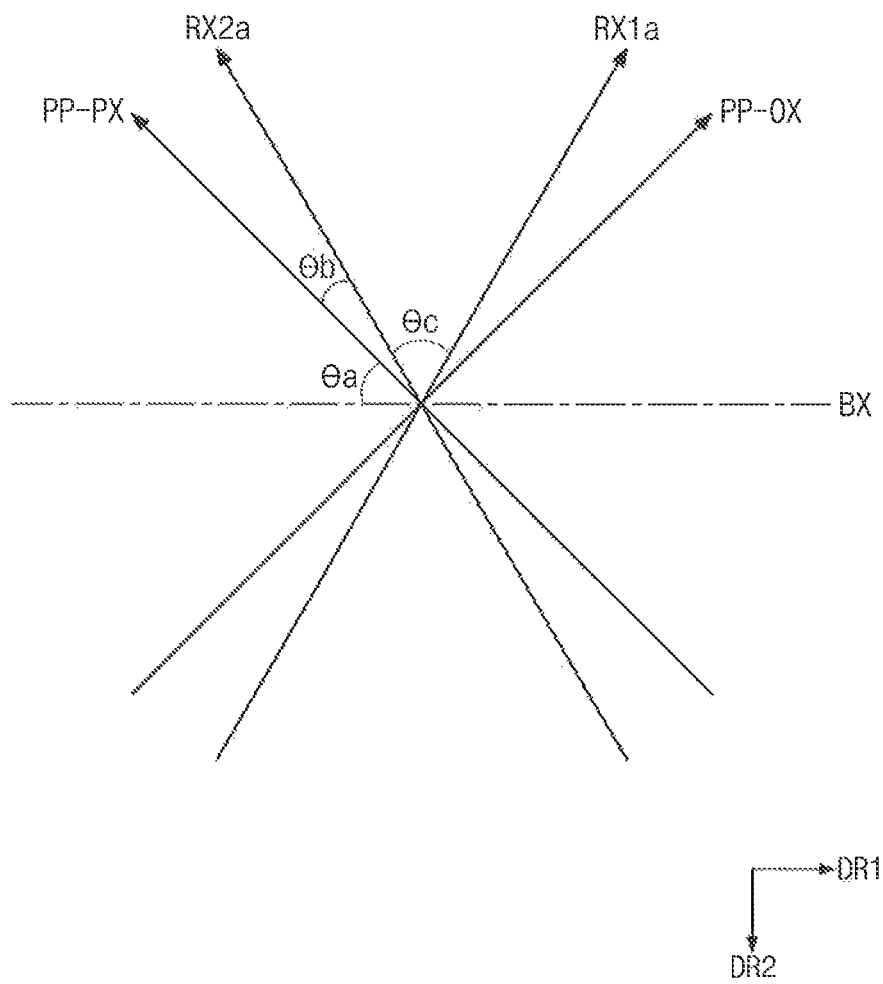
FIG. 9 is a view illustrating a relationship between the absorption axis and the transmission axis of the line polarizer, the first optical axis of the λ/4 phase retardation layer, and the second optical axis of the λ/2 phase retardation layer according to an exemplary embodiment of the present inventive concept.

FIG. 8 is a view illustrating a relationship between the absorption axis PP-OX and the transmission axis PP-PX of the line polarizer PP, the first optical axis RX1 of the λ/4 phase retardation layer RC1, and the second optical axis RX2 of the λ/2 phase retardation layer RC2 according to an exemplary embodiment of the present inventive concept. FIG. 9 is a view illustrating a relationship between an absorption axis PP-OX of the line polarizer PP, a first optical axis RX1 of the λ/4 phase retardation layer RC1, and a second optical axis RX2 of the λ/2 phase retardation layer RC2 when light is projected onto a plane parallel to the plane that is defined by the axis in the first direction DR1 and the axis in the second direction DR2. Although the reference axis BX of the display device DD of FIGS. 1A and 1B is illustrated as an example in FIG. 8, this description may be applied to the reference axis BXa of FIG. 2.

Referring to FIGS. 5 and 8, the line polarizer PP may include an absorption axis PP-OX and a transmission axis PP-PX. An angle between the absorption axis PP-OX and the transmission axis PP-PX may be about 90 degrees. The λ/4 phase retardation layer RC1 may include the first optical axis RX1, and the λ/2 phase retardation layer RC2 may include the second optical axis RX2. Each of the first optical axis RX1 of the λ/4 phase retardation layer RC1 and the second optical axis RX2 of the λ/2 phase retardation layer RC2 may be a slow axis of each of the λ/4 phase retardation layer RC1 and the λ/2 phase retardation layer RC2, respectively.

An angle $\theta 1$ between the absorption axis PP-OX and the reference axis BX may be about 45±30 degrees. An angle $\theta 2$ between the second optical axis RX2 and the absorption axis PP-OX may be about 15±13 degrees, and an angle $\theta 3$ between the second optical axis RX2 and the first optical axis RX1 may be about 40±30 degrees. For example, each of the angles $\theta 1$, $\theta 2$, and $\theta 3$ may represent an acute angle of the angles between the transmission axis PP-PX and the reference axis BX.

Although the absorption axis PP-OX rotates in a counterclockwise direction with respect to the reference axis BX in FIG. 8, the present inventive concept is not limited thereto. For example, the absorption axis PP-OX may rotate in a clockwise direction with respect to the reference axis BX. In this case, the angle $\theta 1$ between the absorption axis PP-OX and the reference axis BX may also be about 45±30 degrees. For example, the angle $\theta 1$ between the absorption axis PP-OX and the reference axis BX may have an angle of about 15 degrees to about 75 degrees, for example, an angle of about 45 degrees.

In a case of the angle $\theta 1$ between the absorption axis PP-OX and the reference axis BX is about 0 degree, the transmission axis PP-PX and the reference axis BX may perpendicular to each other, and thus, molecule bonding in a direction of the transmission axis PP-PX may be broken by a bending operation, and cracks may be formed. In addition, in a case of the angle $\theta 1$ between the absorption axis PP-OX and the reference axis BX is about 90 degrees, the possibility of the breakage of the molecule bonding in the direction of the transmission axis PP-PX may be relatively reduced. However, a phenomenon, in which an image is not seen at a specific position when polarization sunglasses are worn, may occur. In addition, a phenomenon, in which the line polarizer PP is physically torn in the direction of the transmission axis PP-PX may occur. According to an exemplary embodiment of the present inventive concept, bending characteristics may be improved when the angle $\theta 1$ between the absorption axis PP-OX and the reference axis BX ranges from about 15 degrees to about 75 degrees. In addition, the phenomenon in which the molecule bonding is broken in the direction of the transmission axis PP-PX, the phenomenon in which the line polarizer PP is physically torn in the direction of the transmission axis PP-PX, and the phenomenon in which an image is not seen at a specific position when polarization sunglasses are worn may be reduced.

FIG. 9 is a view illustrating a relationship between the absorption axis PP-OX and the transmission axis PP-PX of the line polarizer PP, the first optical axis RX1a of the λ/4 phase retardation layer RC1, and the second optical axis RX2a of the λ/2 phase retardation layer RC2 according to an exemplary embodiment of the present inventive concept. In a description of FIG. 9, the same reference numeral may be given to components that are substantially the same as those of FIG. 8, and the descriptions of the components that are substantially the same as those of FIG. 8 may be omitted.

Referring to FIG. 9, an angle $\theta a$ between the absorption axis PP-OX of the line polarizer PP and the reference axis BX may be about 45±30 degrees. Although the transmission axis PP-PX rotates in a clockwise direction with respect to the reference axis BX in FIG. 9, the present inventive concept is not limited thereto.

An angle $\theta b$ between a second optical axis RX2a and the transmission axis PP-PX may be about 15±13 degrees, and an angle $\theta c$ between the second optical axis RX2a and a first optical axis RX1a may be about 60±30 degrees. When compared to FIG. 8, the relationship between the first optical axis RX1 and the second optical axis RX2 with respect to the absorption axis PP-OX of the line polarizer PP is set in FIG. 8, and the relationship between the first optical axis RX1a and the second optical axis RX2a with respect to the transmission axis PP-PX of the line polarizer PP is set in FIG. 9. The relationship between the first optical axis RX1a and the second optical axis RX2a with respect to the transmission axis PP-PX or the absorption axis PP-OX may be set according to a color required for a design.

According to the present embodiment, since the λ/4 phase retardation layer is realized as the nematic liquid crystal coating layer, and the λ/2 phase retardation layer is realized as the discotic liquid crystal layer, the reliability of the λ/4 phase retardation layer that undergoes the stress relatively greater than that of the λ/2 phase retardation layer may be increased. In addition, since the phase retardation value in the thickness direction of the λ/4 phase retardation layer and the phase retardation value in the thickness direction of the λ/2 phase retardation layer have polarities (e.g., the positive value or the negative value) different from each other, the phase retardation difference in the thickness direction may be offset to reduce the color shift and the reflectance variation depending on the viewing angle of the flexible display device.

While the present inventive concept has been described with reference to exemplary embodiments thereof, it will be understood by those of ordinary skill in the art that various changes in form and details may be made thereto without departing from the spirit and scope of the present inventive concept as defined by the following claims.

What is claimed is:

1. A flexible display device comprising:
   a display module comprising a bending area that is bendable along a reference axis; and
   a polarization member disposed on the display module, wherein the polarization member comprises:
   a λ/4 phase retardation layer disposed on the display module and comprising a nematic liquid crystal coating layer;
   a first adhesion member disposed on the λ/4 phase retardation layer;
   a λ/2 phase retardation layer disposed on the first adhesion member and comprising a discotic liquid crystal coating layer;
   a second adhesion member disposed on the λ/2 phase retardation layer; and
   a line polarizer disposed on the second adhesion member and comprising an absorption axis, wherein an angle between the reference axis and the absorption axis is about 15 degrees to about 75 degrees.

2. The flexible display device of claim 1, wherein the λ/4 phase retardation layer comprises a first optical axis, and the λ/2 phase retardation layer comprises a second optical axis, and
   an angle between the second optical axis and the absorption axis is about 2 degrees to about 28 degrees, and an angle between the first optical axis and the second optical axis is about 30 degrees to about 90 degrees.

3. The flexible display device of claim 1, wherein the λ/4 phase retardation layer comprises a first optical axis, the λ/2 phase retardation layer comprises a second optical axis, and the line polarizer comprises a transmission axis having an angle of about 90 degrees with respect to the absorption axis, and
   an angle between the second optical axis and the transmission axis is about 2 degrees to about 28 degrees, and an angle between the first optical axis and the second optical axis is about 30 degrees to about 90 degrees.

4. The flexible display device of claim 1, wherein one of a phase retardation value of the λ/4 phase retardation layer in a thickness direction of the λ/4 phase retardation layer and a phase retardation value of the λ/2 phase retardation layer in a thickness direction of the λ/2 phase retardation layer has a positive value, and the other one has a negative value.

5. The flexible display device of claim 1, wherein the first adhesion member comprises an adhesive layer having a glass transition temperature of about 40° C. to about 150° C.

6. The flexible display device of claim 1, wherein the first adhesion member has a thickness of about 0.1 micrometers to about 5 micrometers.

7. The flexible display device of claim 1, wherein the first adhesion member comprises an ultraviolet curable adhesive.

8. The flexible display device of claim 1, wherein the λ/4 phase retardation layer has a thickness of about 0.5 micrometers to about 5 micrometers.

9. The flexible display device of claim 1, wherein the second adhesion member comprises an adhesive layer having a glass transition temperature of about −35° C. to about 0° C. or an adhesive layer having a glass transition temperature of about 40 ° C. to about 150° C.

10. The flexible display device of claim 1, wherein the display module has a display surface on which an image is displayed, and
    wherein the display surface is flat in a first operation mode, the display surface is bent such that two sides of the display surface faces each other in a second operation mode, and the display surface is bent such that the display surface is exposed to the outside in a third operation mode.

11. The flexible display device of claim 1, wherein the display module further comprises a flat non-bending area, and
    the bending area extends from at least one side of the flat non-bending area and has a bent shape.

12. The flexible display device of claim 1, further comprising a protection layer disposed under the display module.

13. The flexible display device of claim 12, wherein the protection layer comprises an invar.

14. The flexible display device of claim 12, wherein the protection layer comprises a plastic film.

15. The flexible display device of claim 12, wherein the display module further comprises a non-bending area that extends from the bending area and is not bent, and
    the protection layer overlaps the non-bending area.

16. The flexible display device of claim 15, wherein the display module further comprises a pad area, wherein a driving chip is disposed on the pad area, and
    the protection layer partially overlaps the pad area.

17. The flexible display device of claim 15, wherein the display module includes a display area and a non-display area, wherein the display area displays an image, and the non-display area does not display the image, and
    the protection layer overlaps the display area and the non-display area.

18. The flexible display device of claim 1, wherein the display module includes a display area and a non-display area, wherein the display area displays an image, and the non-display area does not display the image, and
    the polarization member overlaps at least one of the display area and the non-display area.

19. The flexible display device of claim 1, wherein the display module further comprises:
    a display panel configured to display an image; and
    a touch sensing unit disposed on the display panel.

20. The flexible display device of claim 1, further comprising a touch sensing unit disposed on the polarization member.

21. A flexible display device comprising:
a flexible display module; and
a polarization member disposed on the flexible display module,
wherein the polarization member comprises:
a λ/4 phase retardation layer disposed on the flexible display module and comprising a nematic liquid crystal coating layer having a positive phase retardation value in a thickness direction of the λ/4 phase retardation layer;
a first adhesion member disposed on the λ/4 phase retardation layer and comprising an adhesive layer having a glass transition temperature of about 40° C. to about 150° C.;
a λ/2 phase retardation layer disposed on the first adhesion member and comprising a discotic liquid crystal coating layer having a negative phase retardation value in a thickness direction of the λ/2 phase retardation layer;
a second adhesion member disposed on the λ/2 phase retardation layer; and
a line polarizer disposed on the second adhesion member.

22. The flexible display device of claim 21, wherein the flexible display module comprises a bending area that is bendable along a reference axis,
the line polarizer comprises an absorption axis and a transmission axis, wherein an angle between the reference axis and the absorption axis is about 15 degrees to about 75 degrees, and an angle between the absorption axis and the transmission axis is about 90 degrees,
the λ/4 phase retardation layer comprises a first optical axis, and the λ/2 phase retardation layer comprises a second optical axis, and
an angle between the second optical axis and the transmission axis or between the second optical axis and the absorption axis is about 2 degrees to about 28 degrees, and an angle between the first optical axis and the second optical axis is about 30 degrees to about 90 degrees.

23. The flexible display device of claim 1, further comprising an optical compensation layer,
wherein the optical compensation layer is a positive C-plate when a sum of a phase retardation value of the λ/4, phase retardation layer in a thickness direction and a phase retardation value of the λ/2 phase retardation layer in the thickness direction has a negative value, and
wherein the optical compensation layer is a negative C-plate when the sum of the phase retardation value of the λ/4 phase retardation layer in the thickness direction and the phase retardation value of the λ/2 phase retardation layer in the thickness direction has a positive value.

* * * * *